(12) United States Patent
Akihiro

(10) Patent No.: US 6,407,815 B2
(45) Date of Patent: Jun. 18, 2002

(54) OPTICAL DISPLACEMENT MEASUREMENT SYSTEM

(75) Inventor: Kuroda Akihiro, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 09/346,180

(22) Filed: Jul. 1, 1999

(30) Foreign Application Priority Data

Jul. 2, 1998 (JP) .......................................... 10-187842
Aug. 20, 1998 (JP) .......................................... 10-234546

(51) Int. Cl.$^7$ ............................................. G01B 11/02
(52) U.S. Cl. ...................................... 356/499; 356/356
(58) Field of Search .................. 356/356, 358, 356/499; 250/237 G, 231.14

(56) References Cited

U.S. PATENT DOCUMENTS

| | | | |
|---|---|---|---|
| 4,577,968 A | | 3/1986 | Makosch ...................... 356/356 |
| 4,930,895 A | * | 6/1990 | Nishimura et al. .......... 356/356 |
| 4,979,826 A | * | 12/1990 | Ishizuka et al. ............. 356/356 |
| 5,035,507 A | * | 7/1991 | Nishioki et al. ............. 356/356 |
| 5,104,225 A | * | 4/1992 | Masreliez .................... 356/356 |
| 5,390,022 A | * | 2/1995 | Ishizuka et al. ............. 356/356 |
| 5,448,357 A | * | 9/1995 | Muraki ........................ 356/356 |
| 5,557,396 A | * | 9/1996 | Ishizuka et al. ............ 356/28.5 |
| 6,005,667 A | * | 12/1999 | Takamiya et al. ........... 356/356 |
| 6,034,761 A | * | 3/2000 | Takamiya ................... 356/28.5 |
| 6,154,278 A | * | 11/2000 | Ito et al. ..................... 356/354 |

FOREIGN PATENT DOCUMENTS

GB          2227558 A1       1/1990

* cited by examiner

*Primary Examiner*—Frank G. Font
*Assistant Examiner*—Phil S. Natividad
(74) *Attorney, Agent, or Firm*—Jay H. Maioli

(57) ABSTRACT

An optical displacement measurement system that can detect the position of an object with an enhanced degree of resolution, wherein a coherent beam La is focussed on the lattice plane of a diffraction grating and, at the same time, a diffracted beam Lb is focussed on the light receiving plane of a light receiving means 3. The length of the optical path of any diffracted laser beam that passes through the aperture of a second focussing means 5 remains invariable. Therefore, if the optical axis of the diffracted beam Lb is deviated, the spot where it is focussed on the light receiving plane of the light receiving means 3 is not shifted and hence the length of the optical path will not change. Two diffracted laser beams having in equal length of optical path are made to interfere with each other in order to detect the phase difference. The displaced postion of the diffraction grating coherent beam La1 is then measured on the basis of the phase difference.

13 Claims, 27 Drawing Sheets

DIRECTIONS $C_1, C_2$: LATTICE DIRECTIONS
DIRECTIONS $D_1, D_2$: GRATING VECTOR DIRECTIONS
DIRECTIONS $E_1$ $E_2$: NORMAL VECTOR DIRECTIONS

OPTICAL DISPLACEMENT MEASUREMENT SYSTEM

BACKGROUND OF THE INVENTION

1. Field of the Invention

This invention relates to an optical displacement measurement system for detecting the relative movement, if any, of a movable part of a semiconductor manufacturing apparatus, a machine tool or some other apparatus.

2. Description of Related Art

Optical displacement measurement systems utilizing a diffraction grating to detect the relative movement of a movable part of an apparatus such as a semiconductor manufacturing apparatus or a machine tool are known.

For example, FIGS. 1 and 2 of the accompanying drawings show a known optical displacement measurement system described in Japanese Patent Application Laid-Open No. 60-98302. FIG. 1 is a schematic perspective view of the known optical displacement measurement system 100 and FIG. 2 is a schematic view of the optical displacement measurement system 100 as viewed along arrow N1 in FIG. 1.

This known optical displacement measurement system 100 comprises a diffraction grating 101 adapted to linearly move in directions indicated respectively by arrows X1 and/or X2 in the drawings in response to a movement of the movable part of a machine tool, a coherent light source 102 for emitting a coherent laser beam, a half mirror 103 for dividing the laser beam emitted from the coherent light source 102 into two beams and causing the two diffracted beams from the diffraction grating 101 to overlap and interfere with each other, a pair of mirrors 104a, 104b for reflecting the respective beams diffracted by the diffraction grating 101 and a photodetector 105 for receiving the two diffracted beams and generating an interference signal.

The laser beam emitted from the coherent light source 102 is split into two beams by the half mirror 103. Then, the two beams are made to strike the diffraction grating 101. The two beams striking the diffraction grating 101 are then diffracted by the diffraction grating 101 and leave the latter as diffracted beams. The two primary diffracted beams diffracted by the diffraction grating 101 are subsequently reflected by the mirrors 104a, 104b respectively. The diffracted beams reflected by the respective mirrors 104a, 104b are made to strike the diffraction grating 101 once again and diffracted by the diffraction grating 101 for another time before being returned to the half mirror 103, reversely following the same light paths. The diffracted beams returned to the half mirror 103 are caused to overlap and interfere with each other before being detected by the photodetector 105.

With the known optical displacement measurement system 100, the diffraction grating 101 moves in directions indicated by arrows X1, X2 respectively. Then, in the optical displacement measurement system 100, the two diffracted beams produced by the diffraction grating 101 show a phase difference as a function of the movement of the diffraction grating 101. Thus, the optical displacement measurement system 101 can determine the displacement of the movable part of the machine tool by detecting the phase difference of the two diffracted beams from the interference signal produced by the photodetector 105.

FIGS. 3 and 4 of the accompanying drawings show another known optical displacement measurement system described in Japanese Patent Application Laid-Open No. 60-98302. FIG. 3 is a schematic perspective view of the known optical displacement measurement system 110 and FIG. 4 is a schematic view of the optical displacement measurement system 110 as viewed along arrow N1 in FIG. 3.

This known optical displacement measurement system 110 comprises a diffraction grating 111 adapted to linearly move in directions indicated respectively by arrows X1 and/or X2 in the drawings in response to a movement of the movable part of a machine tool, a coherent light source 112 for emitting a coherent laser beam, a half mirror 113 for dividing the laser beam emitted from the coherent light source 112 into two beams and causing the two diffracted beams from the diffraction grating 111 to overlap and interfere with each other, a first pair of mirrors 114a, 114b for reflecting the respective beams diffracted by the diffraction grating 111 to a same and identical spot on the diffraction grating 111 and a second pair of mirrors 115a, 115b for reflecting the respective diffracted beams diffracted by the diffraction grating 111 and a photodetector 116 for receiving the two diffracted beams and generating an interference signal.

The laser beam emitted from the coherent light source 112 is split into two beams by the half mirror 113. Then, the two beams are reflected respectively by the first pair of mirrors 114a, 114b and made to strike the diffraction grating 111 as a same and identical spot. The two beams striking the diffraction grating 111 are then diffracted by the diffraction grating 111 and leave the latter as diffracted beams. The two primary diffracted beams diffracted by the diffraction grating 111 are subsequently reflected by the second pair of mirrors 115a, 115b respectively. The diffracted beams reflected by the second pair of mirrors 104a, 104b are made to strike the diffraction grating 111 once again and diffracted by the diffraction grating 111 for another time before being returned to the half mirror 113, reversely following the same light paths. The diffracted beams returned to the half mirror 113 are caused to overlap and interfere with each other before being detected by the photodetector 116.

With the known optical displacement measurement system 110, the diffraction grating 111 moves in directions indicated by arrows X1, X2 respectively. Then, in the optical displacement measurement system 110, the two diffracted beams produced by the diffraction grating 111 show a phase difference as a function of the movement of the diffraction grating 111. Thus, the optical displacement measurement system 111 can determine the displacement of the movable part of the machine tool by detecting the phase difference of the two diffracted beams from the interference signal produced by the photodetector 116.

Now, with the trend of enhanced high precision of machine tools and industrial robots in recent years, optical displacement measurement systems of the type under consideration are required more often than not to have a position detecting capability with a degree of resolution of tens of several nanometers to several nanometers.

For an optical displacement measurement system to have a high degree of resolution, it is required to detect a large interference signal. Then, the two diffracted beams to be made to interfere with each other have to be overlapped with a very high degree of precision.

However, with either of the above described known optical displacement measurement systems 100, 110, the diffracted beams can become displaced from each other to abruptly dwarf the interference signal and make it impossible to detect the position of the movable part if the diffraction grating 101 or 111, whichever appropriate, is moved in a direction other than the right direction of movement or has undulations. For example, if the diffraction grating 101 or 111 is rotated in the directions of arrows A1 and A2 of B1 and B2 as shown in FIGS. 1 through 4, it is no longer possible to detect the position of the movable part or the machine tool that is under scrutiny.

FIG. 5 of the accompanying drawings shows an optical displacement measurement system 120 obtained by modifying the above described known optical displacement measurement system 100. Referring to FIG. 5, it has a first lens 106 for focussing the laser beams emitted from the coherent light source 102 on the mirrors 104a, 104b and a second lens 107 for focussing the two diffracted beams that have been made to overlap and interfere with each other by the half mirror 103 on the light receiving plane of the photodetector 105.

However, this optical displacement measurement system 120 is also not free from the above pointed out problem that the diffracted beams can become displaced from each other to abruptly dwarf the interference signal and make it impossible to detect the position of the movable part if the diffraction grating 101 is moved in a direction other than the right direction of movement or has undulations.

For instance, if the diffraction grating 101 is angularly moved by about 1/60 of a degree in the directions of arrows A1 and A2 and about 1/6 of a degree in the directions of arrows B1 and B2, the magnitude of the interference signal will change by 20%. If a reflection type diffraction grating is used, the angle of tolerance in the directions of arrow B1 and B2 will be reduced to a fraction of the above cited value to make it further difficult to detect the position of the movable part.

FIG. 6 of the accompanying drawings illustrates a known optical displacement measurement system described in Japanese Patent Application Laid-Open No. 2-167427.

Referring to FIG. 6, the optical displacement measurement system 130 comprises a diffraction grating 131 adapted to linearly move in directions indicated respectively by arrows X1 and/or X2 in the drawings in response to a movement of the movable part of a machine tool, a laser diode 132 for emitting a laser beam, a first half mirror 133 for dividing the laser beam emitted from the laser diode 132, first and second light receiving elements 134, 135 for receiving the two diffracted beams transmitted through the diffraction grating 131, a pair of lenses 136, 137 for focussing the two diffracted beams respectively and a second half mirror 138 for separating and synthetically combining the two diffracted beams focussed by the pair of lenses 136, 137.

The optical displacement measurement system 130 further comprises a first pair of mirrors 139, 140 for reflecting the laser beams produced by the half mirror 133 and causing them to strike the diffraction grating 131, a second pair of mirrors 141, 142 for reflecting the laser beams transmitted by the diffraction grating 131 and causing them to strike the half mirror 138, a ¼ wave plate 143 and a first analyser 144 arranged between the first light receiving element 143 and the half mirror 138 and a second analyser 145 arranged between the second light receiving element 135 and the half mirror 138.

In the optical displacement measurement system 130, the first and second lenses 136, 137 are arranged in such a way that they focus respective beams on the diffraction plane or the refraction plane of the diffraction grating 131. Therefore, the diffracted beams respectively striking the first and second light receiving elements are always held in parallel with each other and the interference signal will fluctuate little if the diffraction grating 131 shows undulations.

However, the proposed optical displacement measurement system 130 only ensures the parallelism of the two diffracted beams. That is, if the diffraction grating 131 is inclined, a uniform interference will be maintained only in the shaded area in FIG. 7 where the two beams are made to overlap with each other. In other words, the two diffracted beams do not interfere with each other in areas other than the area where the two beams are made to overlap with each other so that consequently the obtained interference signal will become dwarfed. Additionally, if the two beams are not strictly parallel relative to each other and involve aberration in any sense of the word, no uniform interference will be ensured even in the area where the two beams are made to overlap with each other.

FIG. 8 of the accompanying drawings illustrates a known optical displacement measurement system described in Japanese Patent Application Laid-Open No 1-185415.

Referring to FIG. 8, the known optical displacement measurement system 150 comprises a transmission type diffraction grating 151 adapted to linearly move in directions indicated respectively by arrows X1 and/or X2 in the drawings in response to a movement of the movable part of a machine tool, a laser diode 152 for emitting a laser beam, a collimator lens 153 for collimating the laser beam emitted from the laser diode 152, a first half mirror 154 for dividing the collimated laser beam into two beams, a first pair of mirrors 155a, 155b for respectively reflecting the divided beams and cause them to strike the diffraction grating 151, a second pair of mirrors 156a, 156b for respectively reflecting the diffracted beams produced by the diffraction grating 151 as the divided beams are transmitted therethrough, a pair of polarizers 157a, 157b for causing the diffracted beams reflected by the second pair of mirrors 156a, 156b to intersect each other rectangularly, a second half mirror 158 for causing the two diffracted beams to overlap with each other, a first light receiving element 159 for receiving the two diffracted beams made to overlap with each other by the second half mirror 158, a third half mirror 160 for separating the diffracted beams made to overlap with each other by the second half mirror 158, second and third light receiving elements 161 and 162 for respectively receiving the beams produced by the third half mirror 160, an analyser 163 arranged between the third half mirror 160 and the second light receiving element 161 and a ¼ wave plate 164 and another analyser 165 arranged between the third half mirror 160 and the third light receiving element 162.

The two coherent beams of light produced by the first half mirror 154 by dividing the original coherent light beam is regulated for the incident angles respectively by the first pair of mirrors 155a, 155b so that they are made equal to θ. The two coherent beams are made to strike the lattice plane of the diffraction grating 151 at a same and identical spot. The diffracted beams produced from the coherent beams striking the lattice plane with the angle of incidence of θ shows a same angle of diffraction of Φ. With this optical displacement measurement system 150, beams of the 0-th degree do not stray into the light paths of the diffracted beams because the angle of incidence and that of diffraction are differentiated. Therefore, no noise would be generated by a beam of the 0-th degree to make the system capable of reliably detecting the position of the movable part.

However, two coherent beams of light are made to strike the lattice plane of the diffraction grating 151 at a same spot with a same angle of incidence in the above optical displacement measurement system 150. Then, as seen from FIG. 9, the reflected beam produced when one of the coherent beams strikes the diffraction grating 151 travels backwardly the path of the other coherent beam striking the diffraction grating 151 and consequently enters the laser diode 152.

Generally, a laser diode is highly sensitive to a returning beam and made unstable in terms of oscillation and noise generation by such a beam. Then, the wavelength of the laser beam emitted from the laser diode will become unstable. The S/N ratio and the stability of the interference signal will be severely damaged as a reflected beam returns to the laser diode 152 of the optical displacement measurement system 150.

SUMMARY OF THE INVENTION

Therefore, it is an object of the present invention to provide an optical displacement measurement system that can detect the position of a movable part of a machine tool with an enhanced degree of resolution.

Another object of the present invention is to provide an optical displacement measurement system with which any beam reflected by the diffraction grating thereof does not return to the light emitting means of the system so that the position of a movable part of a machine tool can be detected reliably with an enhanced degree of resolution.

According to the invention, the above objects and other objects of the invention are achieved by providing an optical displacement measurement system characterized by comprising a diffraction grating adapted to be irradiated with a coherent beam of light and move in directions parallel to the lattice vector relative to the coherent beam to diffract the coherent beam, a light emitting means for emitting a coherent beam of light, an irradiation optical system for dividing the coherent beam of light emitted from said light emitting means into two coherent beams of light and irradiating said diffraction grating with each of the coherent beams, an interference optical system for causing each of the coherent beams to make the two diffracted beams of light obtained by the diffracting operation of said diffraction grating interfere with each other, a light receiving means for receiving the two diffracted beams interfering with each other and detecting an interference signal and a position detecting means for determining the phase difference of the two diffracted beams from the interference signal detected by said light receiving means and detecting the position of the relatively moved diffraction grating, said irradiation optical system having a first focussing means for focussing the two coherent beams irradiating the diffraction grating on the lattice plane of the diffraction grating, said interference optical system having a second focussing means for focussing the two diffracted beams interfering with each other and received by said light receiving means on the light receiving plane of the light receiving means.

With an optical displacement measurement system having a configuration as described above and schematically illustrated in FIG. 10, the first focussing means 4 focusses the coherent beam of light La emitted from the light emitting means 2 on the lattice plane of the diffraction grating 1. Then, the coherent beam La focussed on the lattice plane of the diffraction grating 1 is diffracted by the diffraction grating 1 to produce a diffracted beam Lb as a result of reflection or transmission. Then, the second focussing means 5 focusses the diffracted beam Lb on the light receiving plane of the light receiving means 3.

With an optical displacement measurement system having a configuration as described above, the length of the light path travelled by the diffracted beam laser beam passing through the aperture of the second focussing means 5 is invariably held to a constant value because the coherent beam La is focussed on the lattice plane of the diffraction grating 1 while the diffracted beam Lb is focussed on the light receiving plane of the light receiving means 3. Therefore, the focussing position of the light receiving plane of the light receiving means 3 does not vary and the length of the light path travelled by the diffracted beam is invariably held to a constant value if the optical axis of the diffracted beam Lb is shifted for some reason or other.

According to another aspect of the invention, there is also provided an optical displacement measurement system characterized by comprising a diffraction grating adapted to be irradiated with a coherent beam of light and move in directions parallel to the lattice vector relative to the coherent beam to diffract the coherent beam, a light emitting means for emitting a coherent beam of light, an irradiation optical system for dividing the coherent beam of light emitted from said light emitting means into two coherent beams of light and irradiating said diffraction grating with each of the coherent beams, an interference optical system for causing each of the coherent beams to make the two diffracted beams of light obtained by the diffracting operation of said diffraction grating interfere with each other, a light receiving means for receiving the two diffracted beams interfering with each other and detecting an interference signal and a position detecting means for determining the phase difference of the two diffracted beams from the interference signal detected by said light receiving means and detecting the position of the relatively moved diffraction grating, said irradiation optical system being adapted to form optical paths respectively for said two coherent beams on a plane inclined relative to the direction perpendicular to the lattice plane of said diffraction grating and irradiate a same and identical spot on the lattice plane of said diffraction grating with the two coherent beams.

With an optical displacement measurement system having a configuration as described above, optical paths are formed in a direction inclined relative to the direction perpendicular to the lattice plane of the diffraction grating respectively for the two coherent beams and the coherent beams are made to irradiate a same and identical spot on the lattice plane of the diffraction grating. Then, the phase difference of the two diffracted beams produced by the two coherent beams is determined to detect the relative displacement of the diffraction grating.

DETAILED DESCRIPTION OF THE INVENTION

Figure 1:
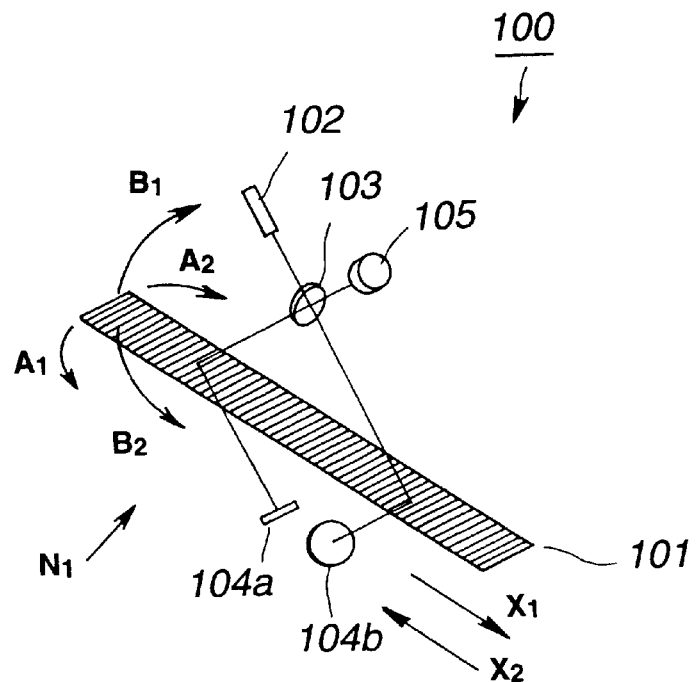
FIG. 1 is a schematic perspective view of a known optical displacement measurement system described in Japanese Patent Application Laid-Open No. 60-98302.
Figure 2:
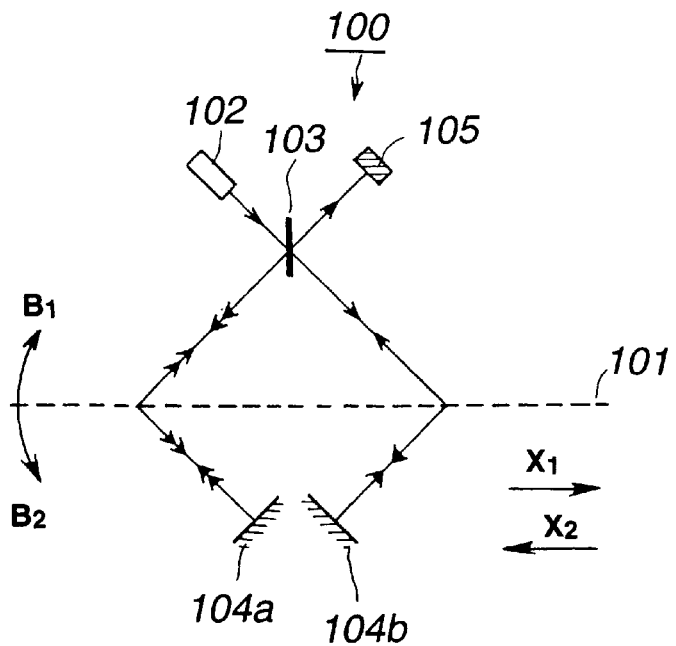
FIG. 2 is a schematic view of the optical displacement measurement system of FIG. 1 as viewed along direction N1 in FIG. 1.
Figure 3:
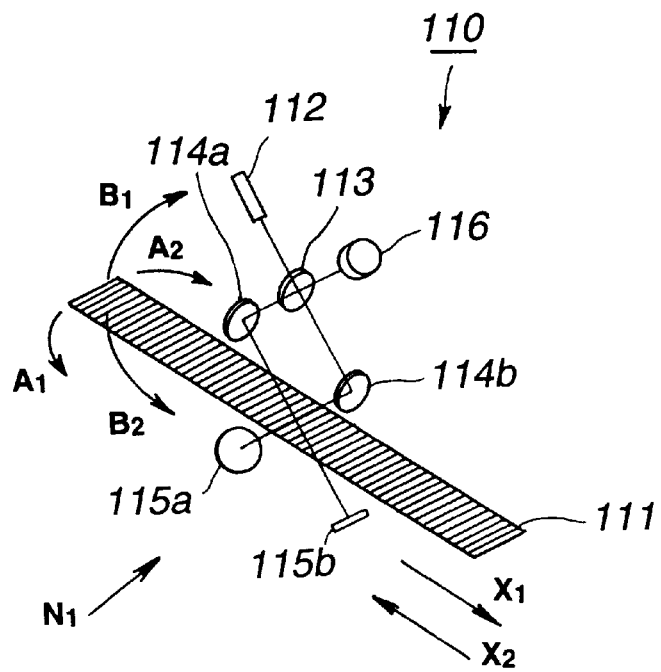
FIG. 3 is a schematic perspective view of another known optical displacement measurement system described in Japanese Patent Application Laid-Open No. 60-98302.
Figure 4:
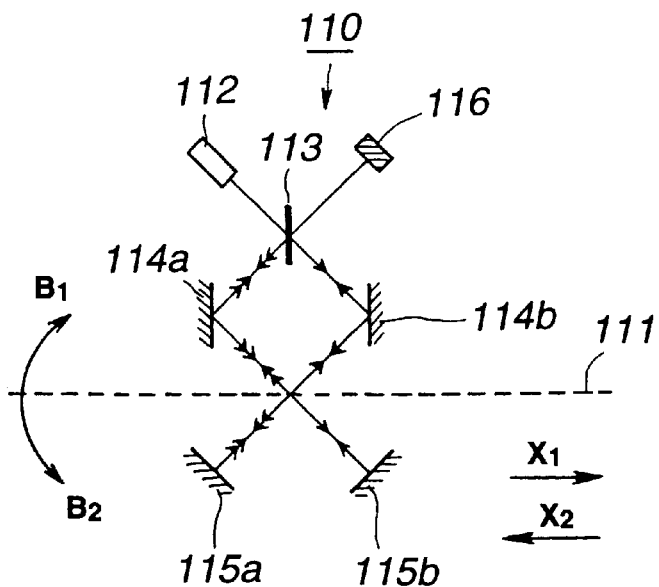
FIG. 4 is a schematic view of the optical displacement measurement system of FIG. 3 as viewed along direction N1 in FIG. 1.
Figure 5:
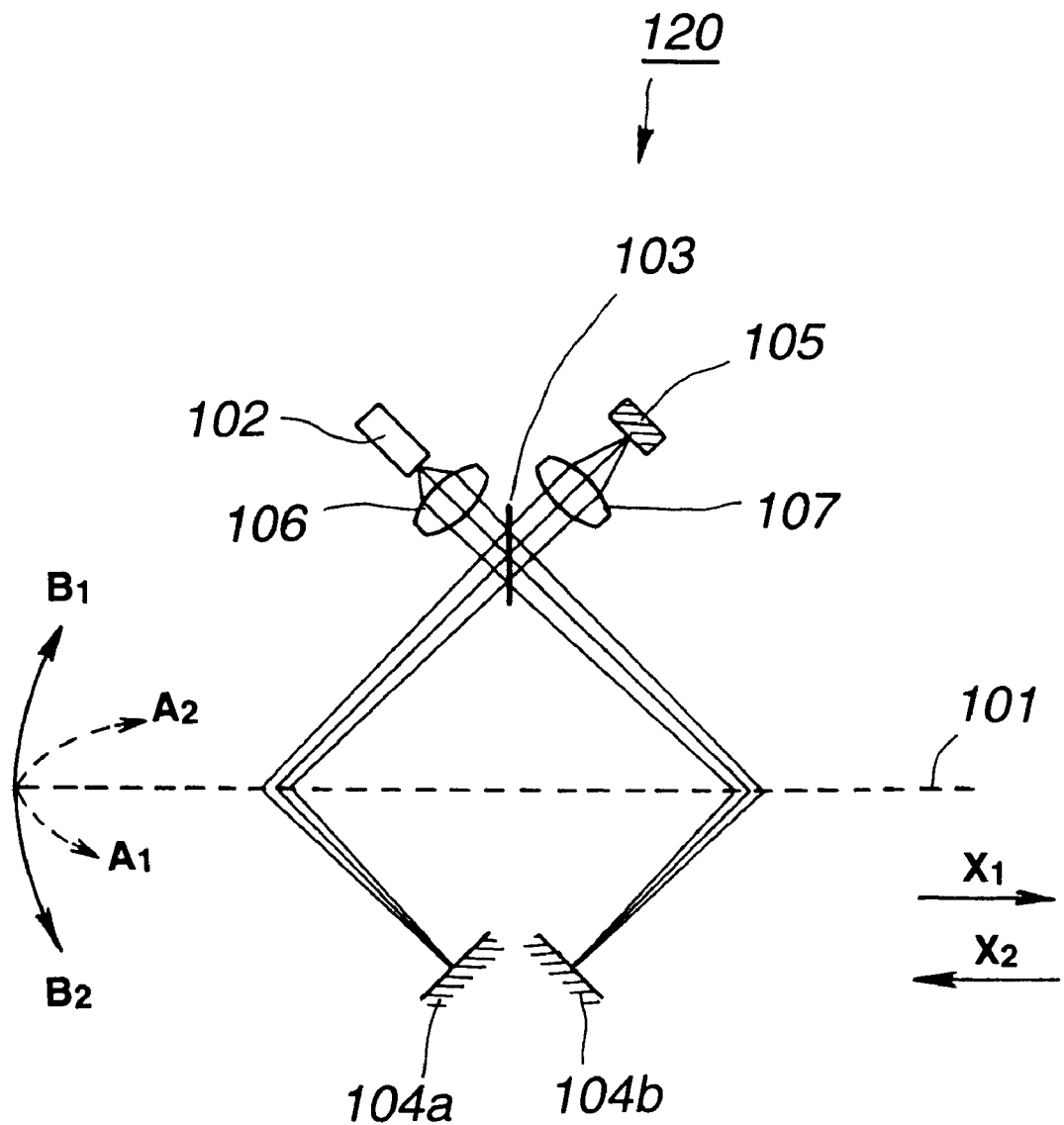
FIG. 5 is a schematic view illustrating the operation of an optical displacement measurement system obtained by modifying the known optical displacement measurement system of FIG. 1.
Figure 6:
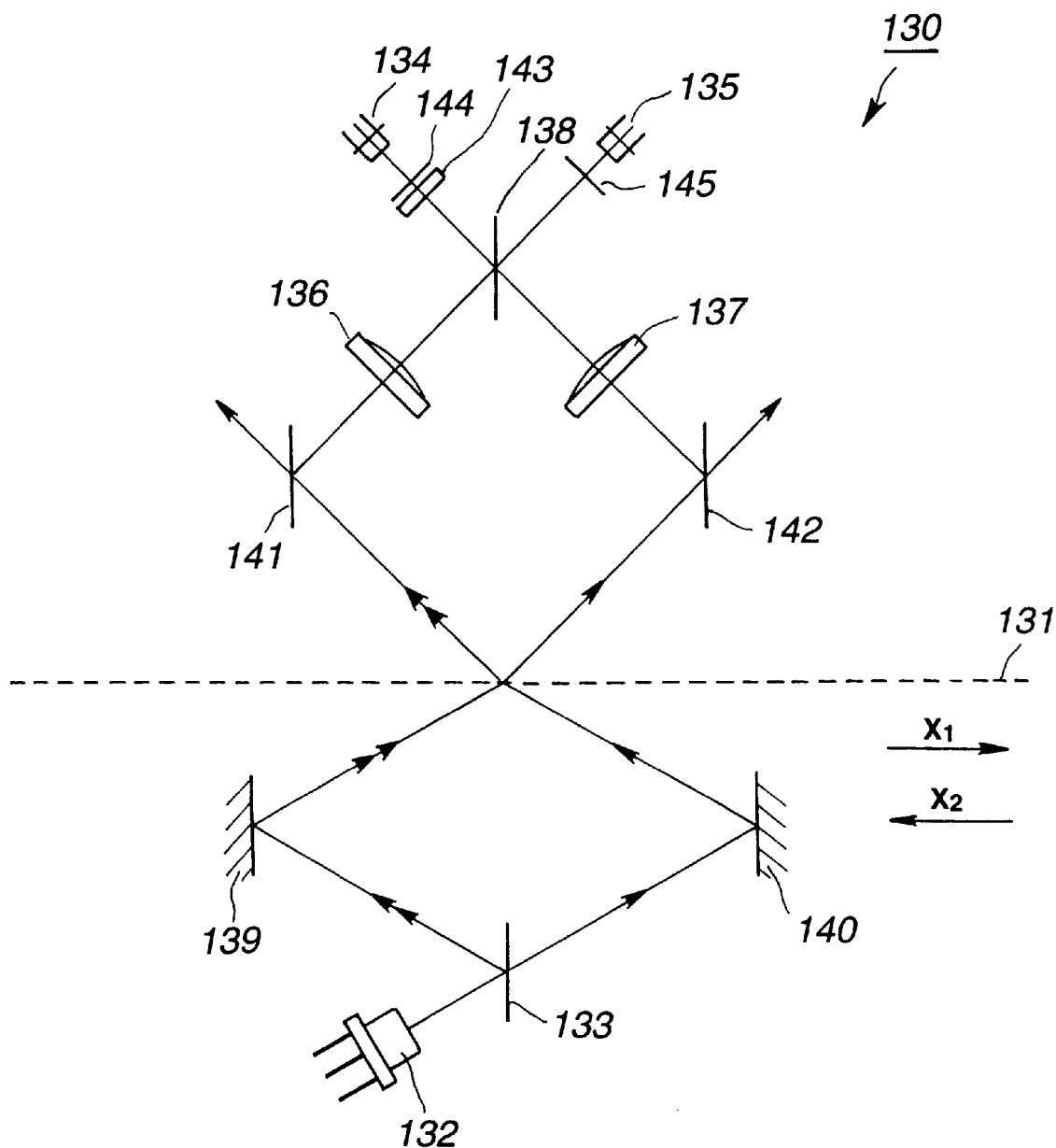
FIG. 6 is a schematic perspective view of still another known optical displacement measurement system described in Japanese Patent Application Laid-Open No. 2-167427.
Figure 7:
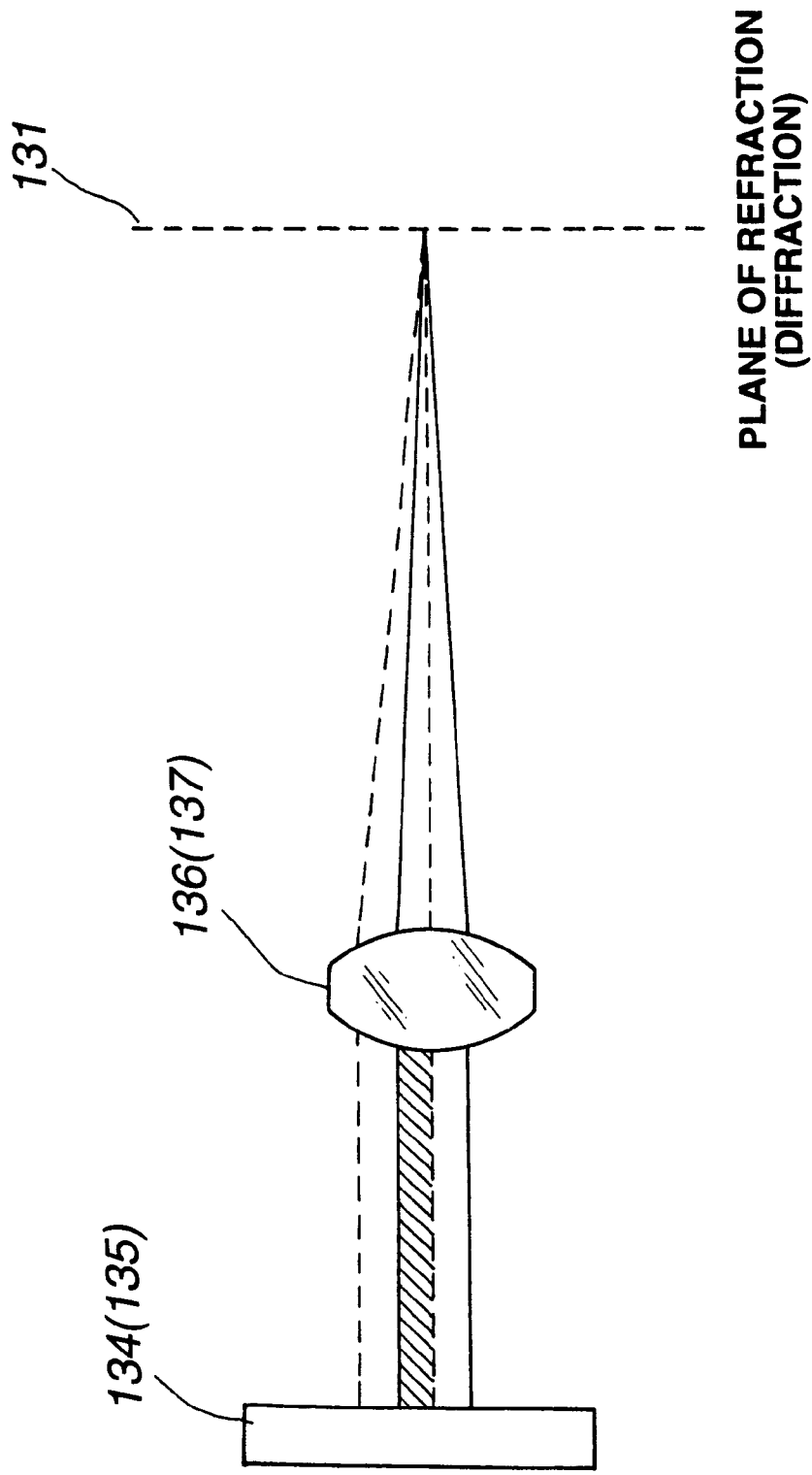
FIG. 7 is a schematic view illustrating the operation of the light receiving element irradiated with diffracted beams of light of an optical displacement measurement system of Japanese Patent Application Laid-Open No. 2-167427.
Figure 8:
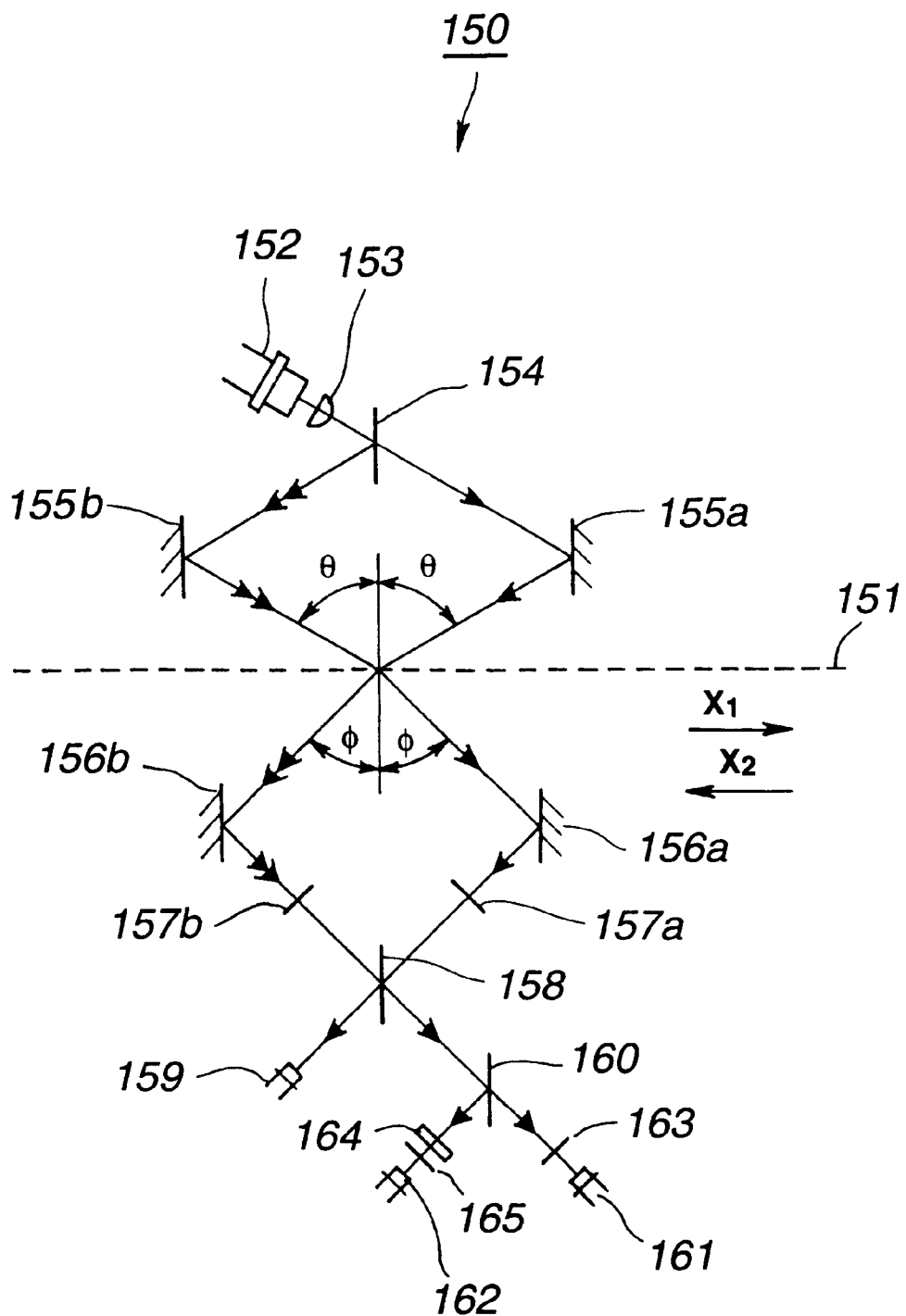
FIG. 8 is a schematic view of still another known optical displacement measurement system described in Japanese Patent Application Laid-Open No. 1-185415.
Figure 9:
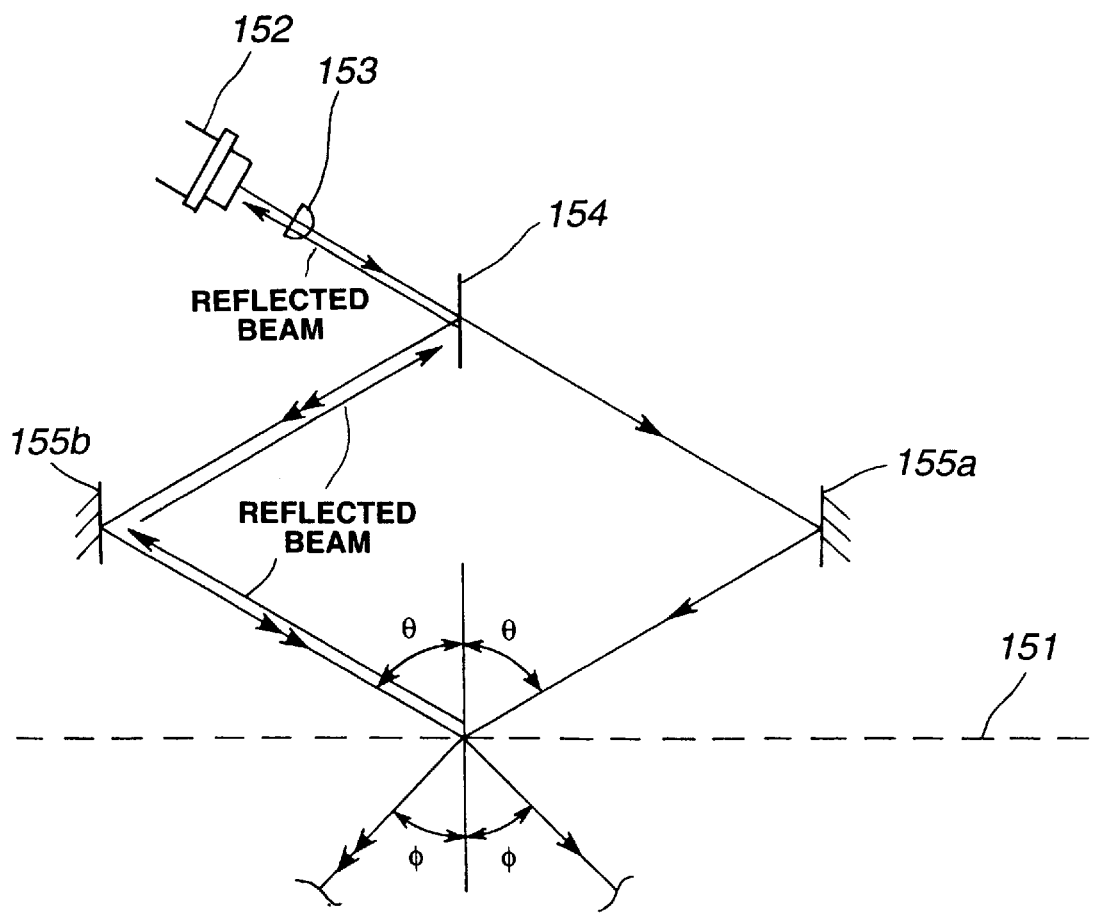
FIG. 9 is a schematic view illustrating a reflected beam returning to the coherent beam source of an optical displacement measurement system of Japanese Patent Application Laid-Open No. 1-185415.
Figure 10:
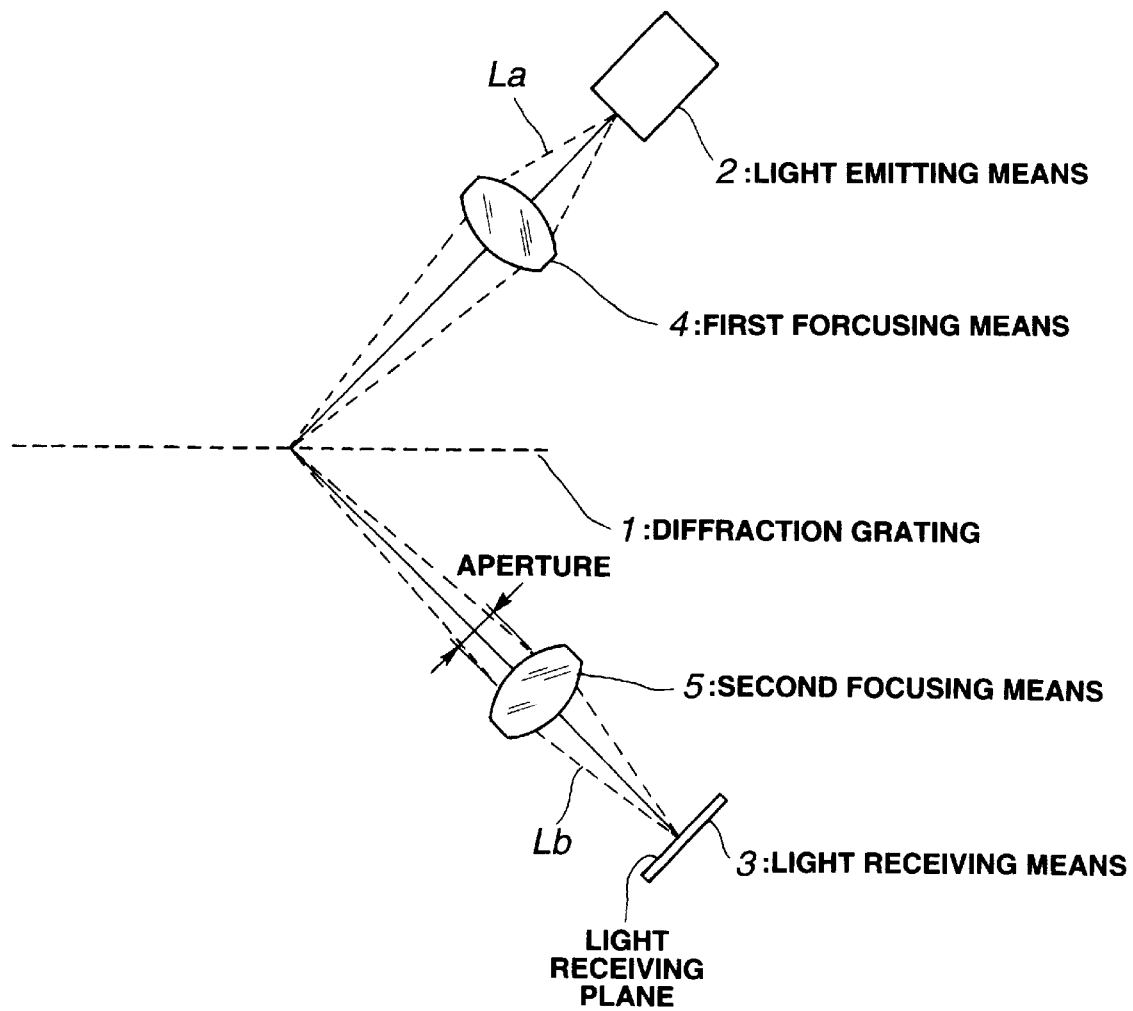
FIG. 10 is a schematic illustration of an optical displacement measurement system according to the present invention.
Figure 11:
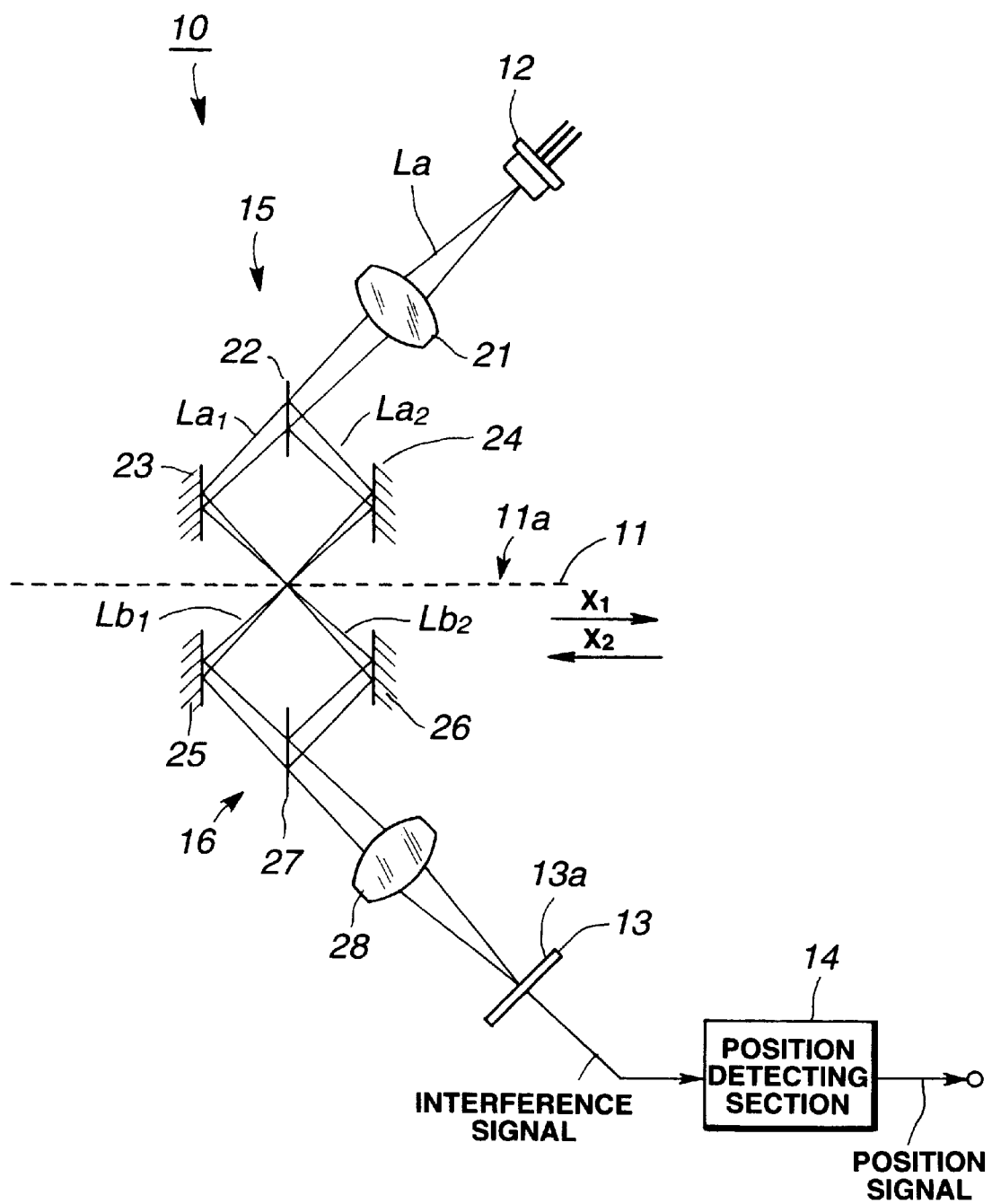
FIG. 11 is a schematic view of a first embodiment of optical displacement measurement system according to the present invention.

Now, the present invention will be described by way of a first embodiment of optical displacement measurement system according to the invention as shown in FIG. 11.

Referring to FIG. 11, the first embodiment of optical displacement measurement system 10 according to the invention comprises a diffraction grating 11 adapted to be irradiated with a coherent beam of light and move in directions parallel to the lattice vector relative to the coherent beam to diffract the coherent beam, a coherent light source 12 for emitting a coherent beam of light La such as a laser beam, a light receiving element 13 for receiving two interfering diffracted beams Lb1, Lb2 to generate an interference signal, a position detecting section 14 for detecting the displaced position of the diffraction grating 11 on the basis of the interference signal from the light receiving element 13, an irradiation optical system 15 for irradiating the diffraction grating 11 with a coherent beam La emitted from the coherent light source 12 and a light receiving optical system 16 for causing the two diffracted beams Lb1, Lb2 from the diffraction grating to interfere with each other and irradiate the light receiving element 13.

Figure 12:
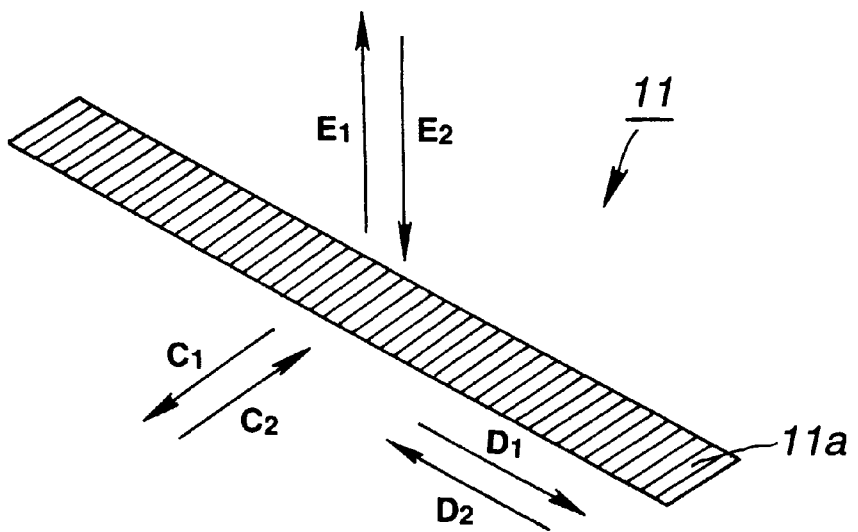
FIG. 12 is a schematic perspective view of a diffraction grating that can be used for the first through seventh embodiments of the present invention.

Referring to FIG. 12, the diffraction grating 11 has a profile like that of a thin plate and provided with a latticework of narrow slits or grooves arranged at regular intervals on the surface. A beam of light striking the diffraction grating 11 is diffracted by the latticework formed on the surface thereof The diffracted beam is then transmitted in a direction defined by the intervals of the lattice and the wavelength of the beam.

For the purpose of describing the embodiment, the surface of the diffraction grating 11 where the latticework is formed will be referred to hereinafter as lattice plane 11a. If the diffraction grating 11 is of a transmission type, both the surface through which a coherent beam enters the diffraction grating and the surface from which a diffracted beam is transmitted away will be referred to as lattice plane 11a. The directions along which the latticework of the diffraction grating 11 is formed (directions indicated by arrows C1 and C2 in FIG. 12) that are the direction perpendicular to the lattice vector representing changes in the transmittivity, reflectivity and the depth of the latticework and parallel to the lattice plane 11a will be referred to as lattice direction. The directions perpendicular to the direction along which the latticework is formed and parallel to the lattice plane 11a (directions indicated by arrows D1 and D2 in FIG. 12) that are the direction parallel to the lattice vector of the diffraction grating 11 will be referred to as lattice vector direction. Finally, the directions perpendicular to the lattice plane 11a (directions indicated by arrows E1 and E2 in FIG. 12) that are the direction perpendicular to the direction along which the latticework is formed and also to the lattice vector will be referred to as normal vector direction. Note that these denominations of the directions of a diffraction grating 11 will also be used in the description of the other embodiments that follows.

The diffraction grating 11 is fitted to a movable part of a machine tool and moved in the lattice vector direction as indicated by arrows X1 and X2 in FIG. 11 along with the movable part.

The coherent light source 12 is a device adapted to emit a coherent beam such as a laser beam. The coherent light source 12 is typically a multi-mode semiconductor laser adapted to emit a laser beam with a coherence length of about several hundred $\mu$.

The light receiving element 13 is a photoelectric conversion element adapted to convert the light irradiating the light receiving plane 13a thereof into an electric signal representing the quantity of light it receives. It may typically comprise a photodetector. The light receiving element 13 receives a coherent beam of light irradiating the light receiving plane 13a and generates an interference signal representing the quantity of light it receives.

The position detecting section 14 outputs a position signal indicating the relatively displaced position of the diffraction grating 11 by determining the phase difference of the two diffracted beams of light on the basis of the interference signal generated by the light receiving element 13.

The irradiation optical system 15 comprises a first focussing element 21 for focussing the coherent beam La emitted from the coherent light source 12 on the lattice plane 11a of the diffraction grating 11, a half mirror 22 for dividing the coherent beam La emitted from the coherent light source 12 into two coherent beams La1, La2, a reflector 23 for reflecting one of the coherent beams, or coherent beam La1, produced by the half mirror 22 and another reflector 24 for reflecting the other coherent beam, or coherent beam La2, produced by the half mirror 22.

The first focussing element 21 comprises an optical element that may be a lens having a predetermined variable range of numerical aperture. The coherent beam La emitted from the coherent light source 12 is made to enter the first focussing element 21. The first focussing element 21 focusses the coherent beam La entering it on the lattice plane 11a of the diffraction grating 11 with a predetermined beam diameter. Preferably, the beam diameter of the focussed beam covers a number of grooves sufficient for the diffraction grating 11 to produce a diffracted beam. The beam diameter is preferably such that the beam may not be affected by the fine pieces of dust and/or the scars on the lattice plane 11a. Preferably, the beam diameter may be adjusted by adjusting the numerical aperture and typically not smaller than tens of several $\mu$m. The focal point may not necessarily be the point where the beam diameter is minimized. A point on the lattice plane 11 that minimizes the difference of the lengths of the optical paths of two beams may alternatively be selected for the focal point.

The coherent beam La emitted from the coherent light source 12 is made to enter the half mirror 22 by way of the first focussing element 21. The half mirror 22 transmits part of the incident coherent beam La to generate a coherent beam La1 and reflects the rest of the incident coherent beam La to generate a coherent beam La2.

The reflector 23 reflects the coherent beam La1 transmitted through the half mirror 22 and makes it strike the lattice plane 11a of the diffraction grating 11 at a predetermined spot. The reflector 24, on the other hand, reflects the coherent beam La2 reflected by the half mirror 22 and makes it strike the lattice plane 11a of the diffraction grating 1 at the predetermined spot. Thus, the reflector 23 and the reflector 24 make the respective coherent beams La1 and La2 strike a same spot on the lattice plane 11a.

On the other hand, the light receiving optical system 16 comprises a reflector 25 for reflecting the diffracted beam Lb1 produced from the coherent beam La1, another reflector 26 for reflecting the diffracted beam Lb2 produced from the coherent beam La2, a half mirror 27 for causing the diffracted beam reflected by the reflector 25 and the diffracted beam Lb2 reflected by the reflector 26 to overlap and interfere with each other and a second focussing element 28 for focussing the two diffracted beams Lb1, Lb2 that are made to overlap and interfere with each other by the half mirror 27 on the light receiving plane 13a of the light receiving element 13.

The diffracted beam Lb1 produced from the coherent beam La1 entering the diffraction grating 11 is made to strike the reflector 25. Then, the reflector 25 reflects the diffracted beam Lb1 and makes it strike the half mirror 27. The diffracted beam Lb2 produced from the coherent beam La2 entering the diffraction grating 11 is made to strike the reflector 26. Then, the reflector 26 reflects the diffracted beam Lb2 and makes it strike the half mirror 27.

The half mirror 27 transmits the diffracted beam Lb1 reflected by the reflector 25 and reflects the diffracted beam Lb2 reflected by the reflector 26 so as to cause the two diffracted beams Lb1 and Lb2 to overlap and interfere with each other.

The second focussing element 28 comprises an optical element that may be a lens having a predetermined variable range of numerical aperture. The two diffracted beams Lb1, Lb2 that are made to overlap with each other by the half mirror 27 then strike the second focussing element 28. Then, the focussing element 28 focusses the two diffracted beams Lb1, Lb2 on the light receiving plane 13a of the light receiving element 13 with a predetermined beam diameter. The focal point may not necessarily be the point where the beam diameter is minimized. A point on the light receiving plane 13a that minimizes the difference of the lengths of the optical paths of two beams may alternatively be selected for the focal point.

With an optical displacement measurement system 10 having a configuration as described above, a phase difference is produced between the two diffracted beams Lb1, Lb2 as the diffraction grating 11 is moved in the directions of the lattice vector with a movement of the movable part of the machine tool. Then, the optical displacement measurement system 10 causes the two diffracted beams Lb1, Lb2 to interfere with each other to detect an interference signal and determines the phase difference of the two diffracted beams Lb1, Lb2 from the interference signal to finally detect the displaced position of the diffraction grating 11.

Figure 13:
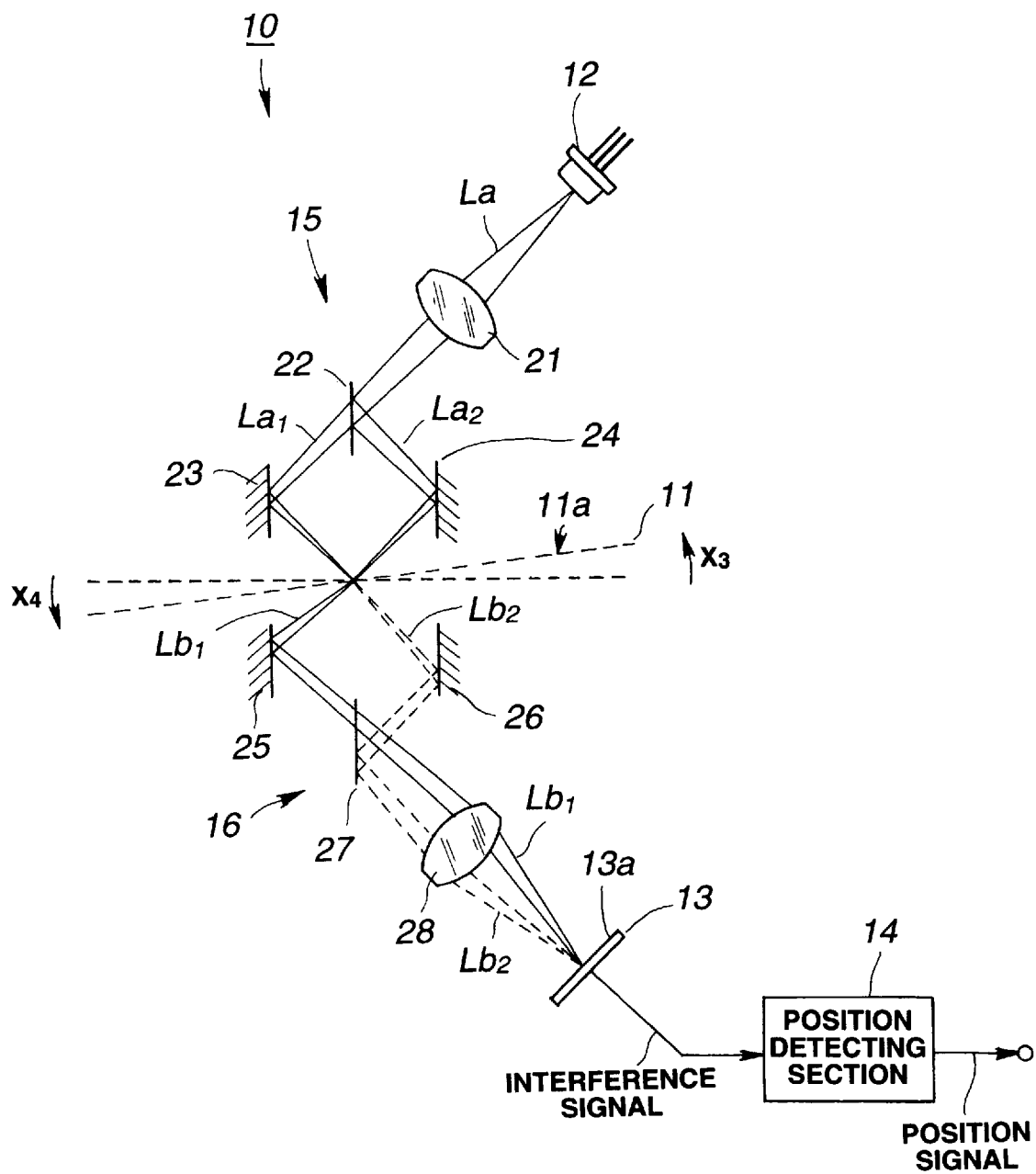
FIG. 13 is a schematic illustration of the optical paths of coherent beams and diffracted beams of the first embodiment of optical displacement measurement system according to the present invention.

Assume here that one of the opposite ends of the diffraction grating 11 as viewed in the lattice vector directions is moved in one of the normal vector directions (e.g., the direction indicated by arrow X3 in FIG. 13) and the other end is moved in the other normal vector direction (e.g., the direction indicated by arrow X4 in FIG. 13) so that the lattice plane 11a is tilted. Then, both the angle of diffraction of the diffracted beam Lb1 and that of the diffracted beam Lb2 change. Therefore, the optical axes of the two diffracted beams Lb1, Lb2 do not agree with each other when they are made to overlap with each other by the half mirror 27.

However, with the optical displacement measurement system 10, the coherent beam La emitted from the coherent light source 12 is focussed on the lattice plane 11a of the diffraction grating 11 by the first focussing element 21 and the two diffracted beams Lb1, Lb2 are focussed on the light receiving plane 13a of the light receiving element 13 by the second focussing element 28. Thus, the lengths of the optical paths of the two diffracted beams Lb1, Lb2 passing through the aperture of the second focussing element 28 will be made equal to each other in the optical displacement measurement system 10. Therefore, the focussed spot on the light receiving plane 13a will not be displaced and the lengths of the optical paths of the diffracted beams Lb1, Lb2 will not change if the optical axes of the two diffracted beams Lb1, Lb2 are displaced.

As a result of this, with the optical displacement measurement system 11 of the present invention, the two diffracted beams Lb1, Lb2 are not displaced relative to each other and exactly overlap with each other. Thus, when the diffraction grating 11 is displaced in a direction other than the directions parallel to the lattice vector, the interference signal detected by the light receiving element 13 will not be degraded even if the diffraction grating 11 is tilted or undulated. Therefore, the displaced position of the movable part of the machine tool can be detected accurately with an enhanced degree of resolution by the optical displacement measurement system 10. Additionally, an optical displacement measurement system 10 according to the invention can be fitted to a movable part of a machine tool with a wide choice of location and the position of the movable part can be detected reliably if the movable part is vibrated or shaken.

Still additionally, since the two diffracted beams Lb1, Lb2 are focussed on a same spot on the light receiving plane 13a of an optical displacement measurement system 10 according to the invention, the beams are free from vignetting and the position of the movable part can be detected reliably and accurately.

With an optical displacement measurement system 10 according to the invention, the distance between the diffraction grating 11 and the irradiation optical system 15 or the light receiving optical system 16 can be increased by enlarging the aperture of the first focussing element 21 or that of the second focussing element 22. Additionally, a small light receiving element 13 may be used in an optical displacement measurement system 10 according to the invention to allow an enhanced degree of freedom for designing the system configuration.

Still additionally, in an optical displacement measurement system 10 according to the invention, measurement errors attributable to fluctuations in the wavelength can be eliminated by making the lengths of the optical paths of the coherent beam La1 and the coherent beam Lb2 equal to each other and also by making the lengths of the optical paths of the diffracted beams Lb1 and the diffracted beam Lb2 equal to each other. For the purpose of adjusting these lengths of the optical paths, a coherent light source 12 that emits a coherent beam showing coherence with which the difference in the length of optical path can be detected as a change in the modulation factor of interference fringes may be used. For example, the positions of the half mirrors 22, 27 can be adjusted so as to maximize the modulation factor of interference fringes by using a multi-mode semiconductor laser with a coherence length of several hundred $\mu$m. Then, the difference among the lengths of the optical paths can be reduced to less than tens of several $\mu$m.

Now, a second embodiment of optical displacement measurement system according to the present invention will be described below. Note that the components of the second embodiment of optical displacement measurement system that are same as or similar to the counterparts of the above described first embodiment will be denoted respectively by the same reference symbols and will not be described any further. Also note that the components of the third and further embodiments of the invention that are same as or similar to those of the first embodiment will also be denoted respectively by the same reference symbols and will not be described any further.

Figure 14:
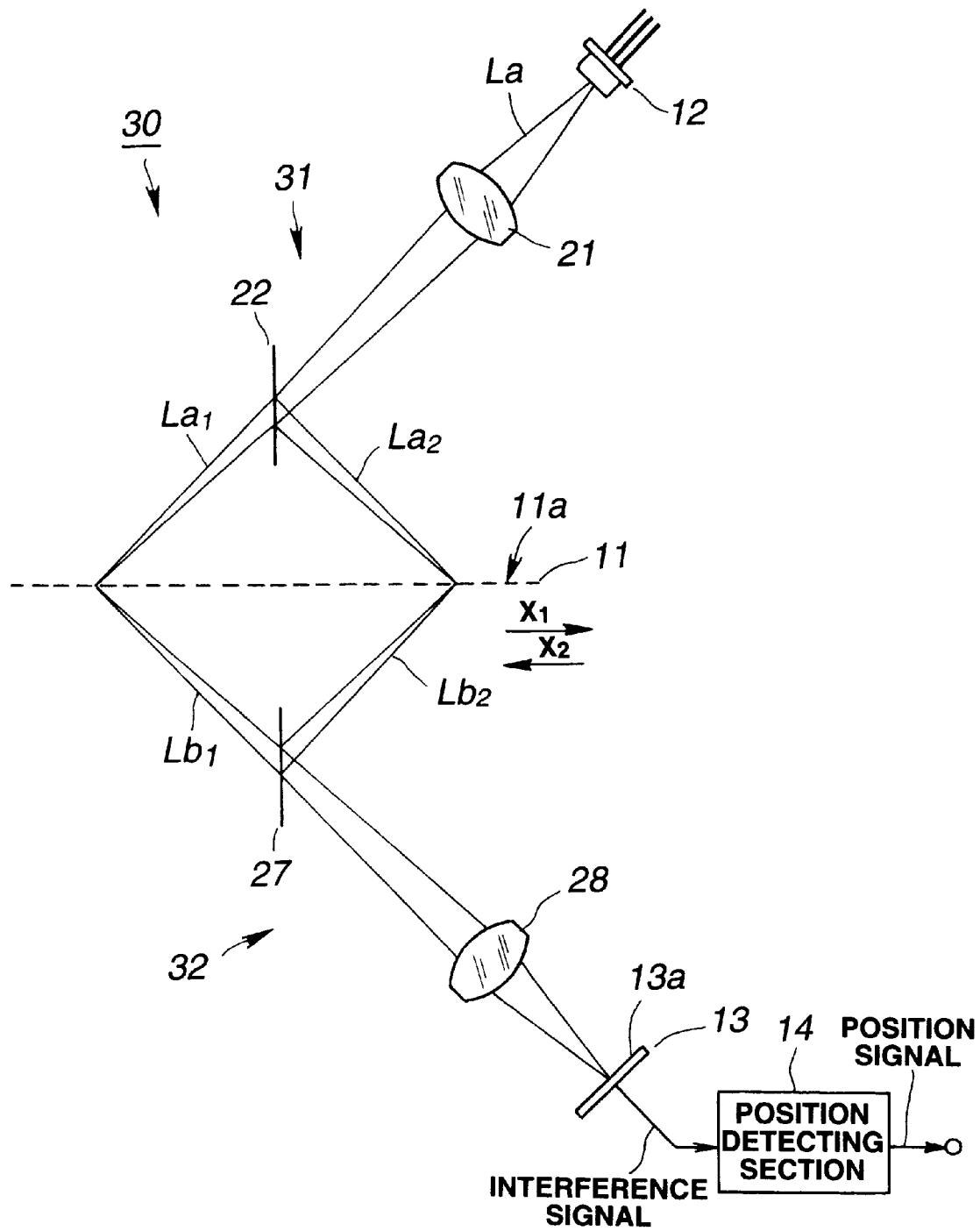
FIG. 14 is a schematic view of a second embodiment of optical displacement measurement system according to the present invention.

Referring to FIG. 14, the second embodiment of optical displacement measurement system 30 according to the invention comprises a diffraction grating 11 adapted to be irradiated with a coherent beam of light and move in directions parallel to the lattice vector relative to the coherent beam to diffract the coherent beam, a coherent light source 12 for emitting a coherent beam of light La such as a laser beam, a light receiving element 13 for receiving two interfering diffracted beams Lb1, Lb2 to generate an interference signal, a position detecting section 14 for detecting the displaced position of the diffraction grating 11 on the basis of the interference signal from the light receiving element 13, an irradiation optical system 31 for irradiating the diffraction grating 11 with a coherent beam La emitted from the coherent light source 12 and a light receiving optical system 32 for causing the two diffracted beams Lb1, Lb2 from the diffraction grating to interfere with each other and irradiate the light receiving element 13.

The irradiation optical system 15 comprises a first focussing element 21 for focussing the coherent beam La emitted from the coherent light source 12 on the lattice plane 11a of the diffraction grating 11 and a half mirror 22 for dividing the coherent beam La emitted from the coherent light source 12 into two coherent beams La1, La2

Unlike the first embodiment of optical displacement measurement system, the irradiation optical system 31 of this embodiment does not comprise reflectors. Therefore, both the coherent beam La1 and the coherent beam Lb2 directly enter the lattice plane 11a of the diffraction grating 11 from the half mirror 22. Thus, the spot at which the coherent beam La1 strikes the lattice plane 11a of the diffraction grating 11 differs from the spot at which the coherent beam Lb1 strikes the lattice plane 11a of the diffraction grating 11.

The light receiving optical system 16 comprises a half mirror 27 for causing the diffracted beam Lb1 produced from the coherent beam La1 and the diffracted beam Lb2 produced from the coherent beam La2 to overlap and interfere with each other and a second focussing element 28 for focussing the two diffracted beams Lb1, Lb2 that are made to overlap and interfere with each other by the half mirror 27 on the light receiving plane 13a of the light receiving element 13.

The diffracted beam Lb1 produced from the coherent beam La1 as the latter strikes the diffraction grating 11 and the diffracted beam Lb2 produced from the coherent beam La2 as the latter strikes the diffraction grating 11 then enter the half mirror 27. The half mirror 27 transmits the diffracted beam Lb1 and reflect the diffracted beam Lb2 so as to cause the two diffracted beams Lb1 and Lb2 to overlap and interfere with each other.

With an optical displacement measurement system 30 having a configuration as described above, a phase difference is produced between the two diffracted beams Lb1, Lb2 as the diffraction grating 11 is moved in the directions of the lattice vector with a movement of the movable part of the machine tool. Then, the optical displacement measurement system 30 causes the two diffracted beams Lb1, Lb2 to interfere with each other to detect an interference signal and determines the phase difference of the two diffracted beams Lb1, Lb2 from the interference signal to finally detect the displaced position of the diffraction grating 11.

Figure 15:
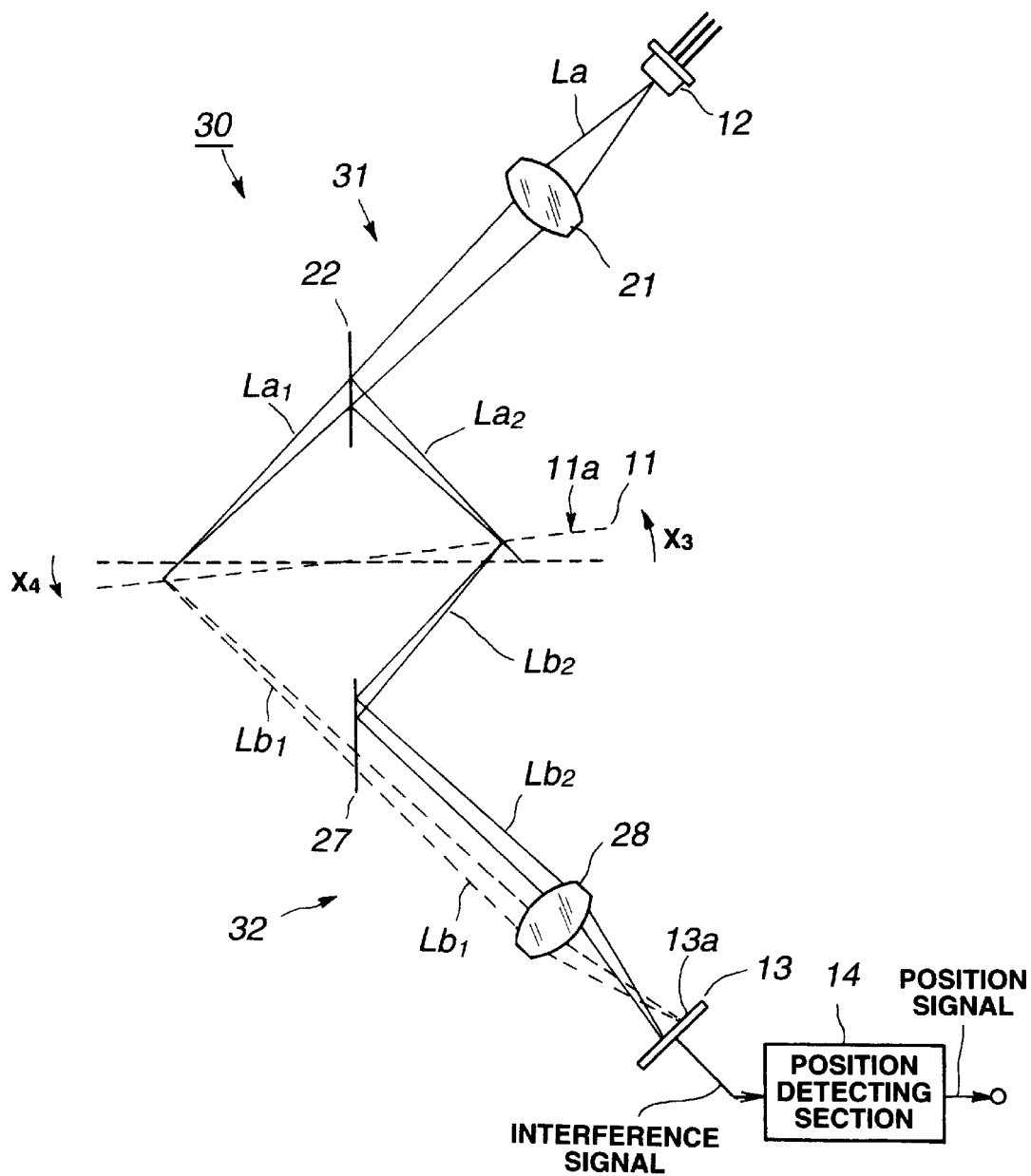
FIG. 15 is a schematic illustration of the diffraction grating of the second embodiment of optical displacement measurement system according to the present invention as the diffraction grating is inclined.

Assume here that one of the opposite ends of the diffraction grating 11 as viewed in the lattice vector directions is moved in one of the normal vector directions (the direction indicated by arrow X3 in FIG. 15) and the other end is moved in the other normal vector direction (the direction indicated by arrow X4 in FIG. 15) so that the lattice plane 11a is tilted. Then, both the angle of diffraction of the diffracted beam Lb1 and that of the diffracted beam Lb2 change. Therefore, the optical axes of the two diffracted beams Lb1, Lb2 do not agree with each other when they are made to overlap with each other by the half mirror 27.

However, with the optical displacement measurement system 30, the coherent beam La emitted from the coherent light source 12 is focussed on the lattice plane 11a of the diffraction grating 11 by the first focussing element 21 and the two diffracted beams Lb1, Lb2 are focussed on the light receiving plane 13a of the light receiving element 13 by the second focussing element 28. Thus, the lengths of the optical paths of the two diffracted beams Lb1, Lb2 passing through the aperture of the second focussing element 28 will be made substantially equal to each other if the spots where the coherent beam La1 and the coherent beam La2 respectively enter the diffraction grating 11. Therefore, the focussed spot on the light receiving plane 13a will not be displaced and the lengths of the optical paths of the diffracted beams Lb1, Lb2 will not change if the optical axes of the two diffracted beams Lb1, Lb2 are displaced.

Figure 20:
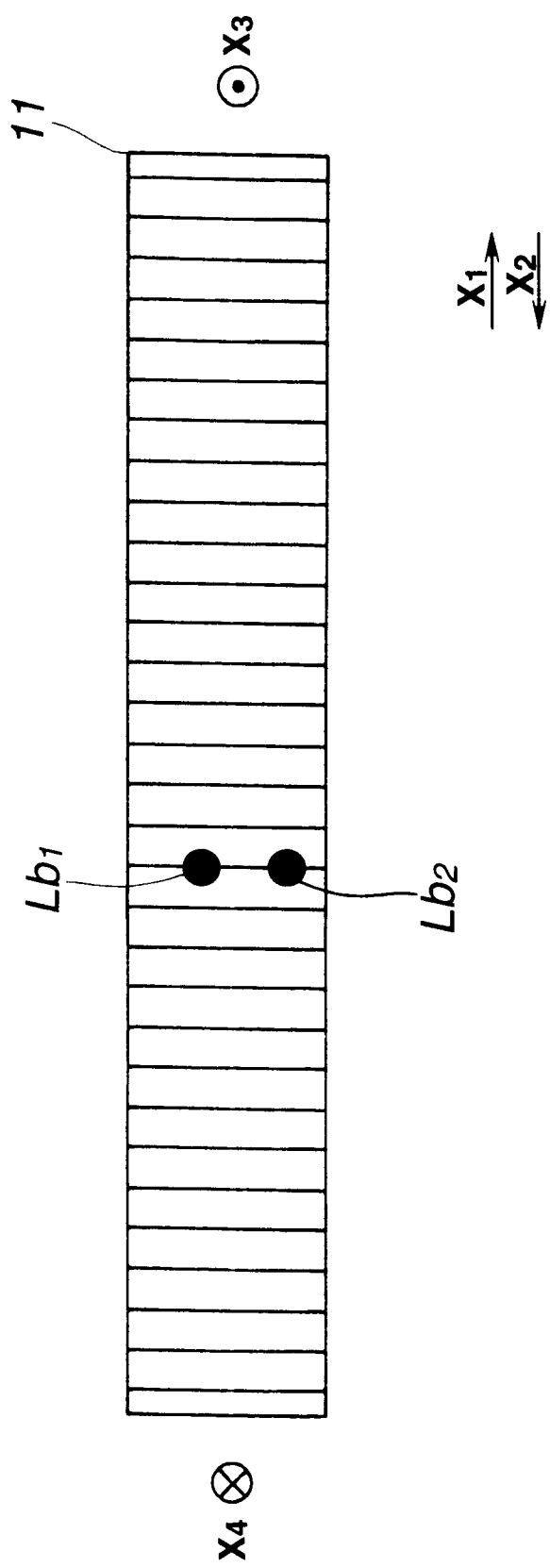
FIG. 20 is a schematic illustration of coherent beams striking the diffraction grating, showing the spots where the coherent beam strike the diffraction grating.

If the diffraction grating 11 is tilted in the directions indicated by arrows A1, A2 in FIG. 20, the lengths of the optical paths of the two diffracted beams Lb1, Lb2 passing through the aperture of the second focussing element 28 are equal to each other so that the spot where they are focussed on the light receiving plane 13a will not be shifted.

Thus, the second embodiment of optical displacement measurement system 30 has a simplified configuration but the displaced position of the movable part of the machine tool can be detected accurately with an enhanced degree of resolution.

Additionally, with the optical displacement measurement system 30, the spot at which the coherent beam La1 strikes the lattice plane 11a of the diffraction grating 11 differs from the spot at which the coherent beam La2 strikes the lattice plane 11a of the diffraction grating 11. Therefore, beams other than the diffracted beams laser beam to be made to interfere with each other such as a diffracted beam of the 0-th degree would not stray into the irradiation optical system 31 nor the light receiving optical system 32. Thus, this embodiment can minimize noises and the displaced position of the movable part of the machine tool can be detected accurately with an enhanced degree of resolution.

Now, a third embodiment of optical displacement measurement system according to the present invention and comprising a reflection type diffraction grating 11 will be described below.

Figure 16:
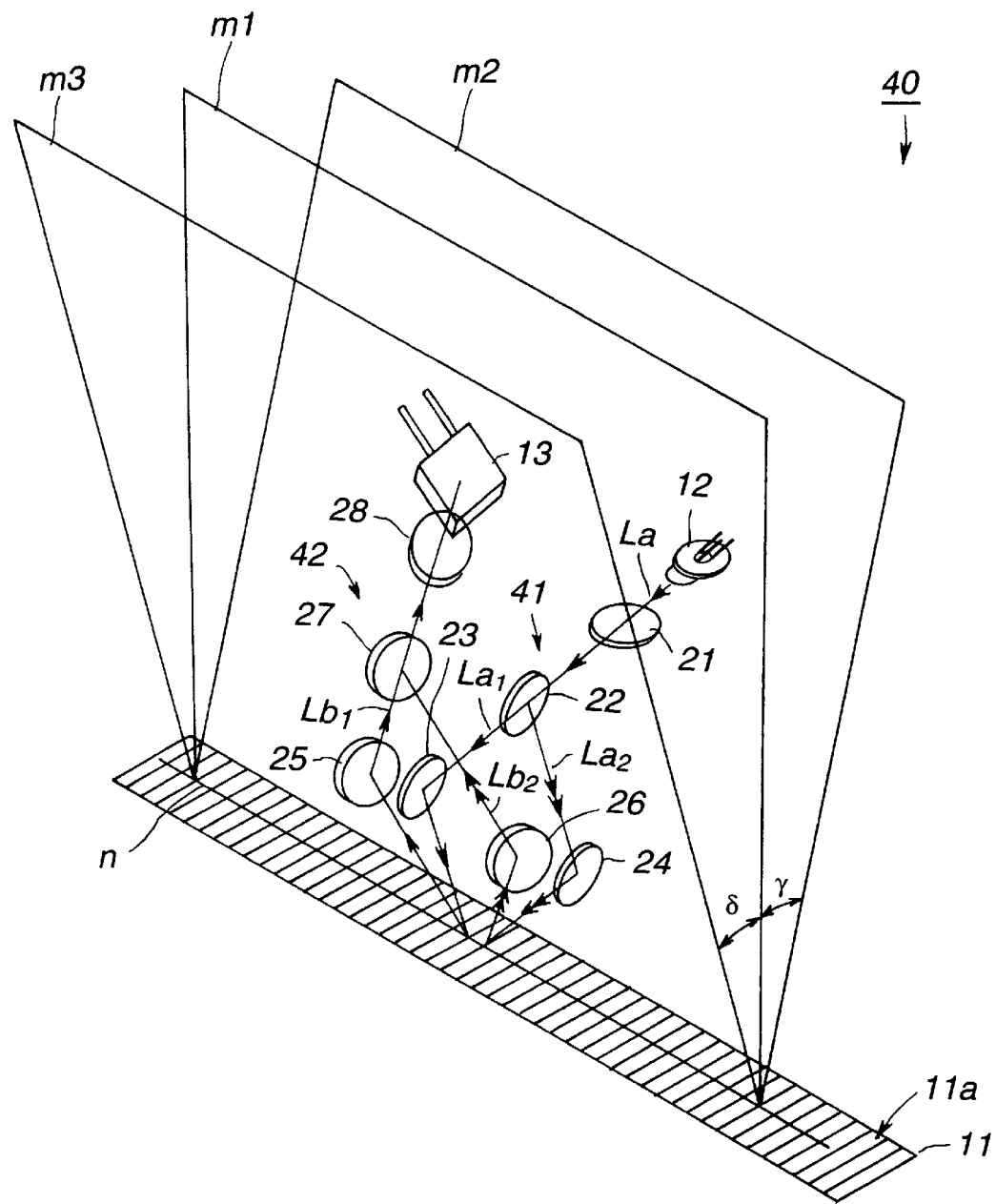
FIG. 16 is a schematic perspective view of a third embodiment of optical displacement measurement system according to the present invention.

FIG. 16 is a schematic perspective view of the third embodiment of optical displacement measurement system.

Referring to FIG. 16, it shows an imaginary linear line n extending in parallel with the directions of the lattice vector on the lattice plane 11a of the diffraction grating 11. It also shows an imaginary plane containing the line n and extending in parallel with the normal vector. This imaginary plane is reference plane m1. There is also shown another imaginary plane containing the line n and tilted from the reference plane m1 by angle of inclination γ. This imaginary plane is referred to as inclined plane m2. There is also shown still another imaginary plane containing the line n and tilted from the reference plane m1 by angle of inclination δ. This imaginary plane is referred to as inclined plane m3. Note that both the inclined plane m2 and the inclined plane m3 are located at a same side relative to the lattice plane 11a of the diffraction grating 11.

Figure 17:
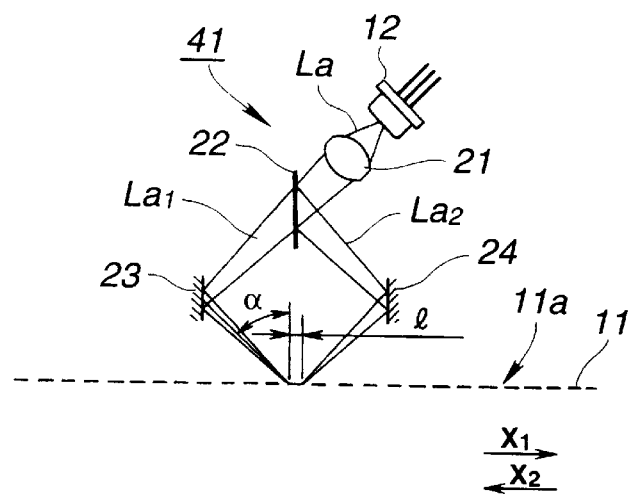
FIG. 17 is a schematic view of a component of the third embodiment of optical displacement measurement system arranged on slope m2 and viewed along a direction perpendicular relative to the slope m2.
Figure 18:
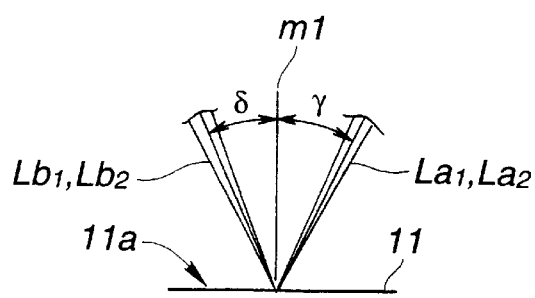
FIG. 18 is a schematic illustration of a coherent beam striking the diffraction grating and a diffracted beam diffracted by the diffraction grating of the third embodiment of optical displacement measurement system according to the present invention as viewed along the direction of the lattice vector.
Figure 19:
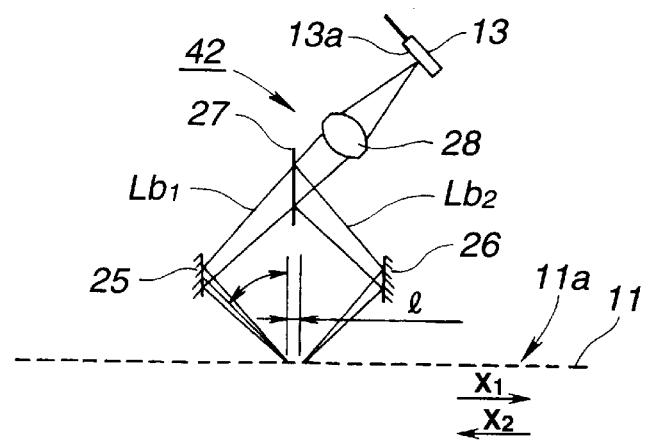
FIG. 19 is a schematic view of a component of the third embodiment of optical displacement measurement system arranged on slope m3 and viewed along a direction perpendicular relative to the slope m3.

FIG. 17 is a schematic view of the embodiment showing the components arranged on the inclined plane m2 as viewed along the direction perpendicular to the inclined plane m2. FIG. 18 is a schematic illustration of a coherent beam striking the diffraction grating 11 and a diffracted beam diffracted by the diffraction grating 11 as viewed along the direction of the lattice vector. FIG. 19 is a schematic view of the embodiment showing the components arranged on the inclined plane m3 as viewed along the direction perpendicular to the inclined plane m3.

This third embodiment of optical displacement measurement system comprises a reflection type diffraction grating 11 and adapted to detect the position of the movable part of a machine tool to which it is fitted.

As shown in FIGS. 16 and 19, the optical displacement measurement system 40 comprises a coherent light source 12 for emitting a coherent beam of light La and an irradiation optical system 41 adapted to divide the coherent beam La into two coherent beams La1, La2 and cause them to strike the diffraction grating 11.

The irradiation optical system 41 comprises a first focussing element 21 for focussing the coherent beam La emitted from the coherent light source 12 on the lattice plane 11a of the diffraction grating 11, a half mirror 22 for dividing the coherent beam La emitted from the coherent light source 12 into two coherent beams La1, La2, a reflector 23 for reflecting one of the coherent beams, or coherent beam La1, produced by the half mirror 22 and another reflector 24 for reflecting the other coherent beam, or coherent beam La2, produced by the half mirror 22.

The components of the irradiation optical system 41 are so arranged that the optical paths of the coherent beams La (La1, La2) passing therethrough are formed on the inclined plane m2. Therefore, the coherent beams La1, La2 show an angle of incidence of $\gamma$ as viewed along the direction of the lattice vector in FIG. 18.

The reflector 23 reflects the coherent beam La1 transmitted through the half mirror 22 and makes it strike the lattice plane 11a of the diffraction grating 11 at a predetermined spot. The reflector 24, on the other hand, reflects the coherent beam La2 reflected by the half mirror 22 and makes it strike the lattice plane 11a of the diffraction grating 1 at the predetermined spot.

The reflector 23 and the reflector 24 make the respective coherent beams La1 and La2 strike predetermined respective spots on the lattice plane 11a in such a way that they show an angle of incidence of $\alpha$ on the inclined plane m2. Note that the reflector 23 and the reflector 24 are arranged with their reflecting planes facing each other. Therefore, the coherent beam L1a and the coherent beam La2 are directed oppositely in terms of the lattice vector direction. Additionally, the reflector 23 and the reflector 24 cause the coherent beam La1 and the coherent beam La2 to strike the lattice plane 11a at respective spots that are separated from each other by a predetermined distance in the lattice vector direction. The distance between the spot at which the coherent beam La1 enters the lattice plane 11a and the spot at which the coherent beam La2 enters the lattice plane 11a is 1 as shown in FIG. 19.

With the optical displacement measurement system 40, the coherent beam La1 is diffracted as it enters the diffraction grating 11 and a diffracted beam Lb1 is produced from the spot where the coherent beam La1 strike and is reflected by the diffraction grating 11. Also, the coherent beam La2 is diffracted as it enters the diffraction grating 11 and a diffracted beam Lb2 is produced from the spot where the coherent beam La2 strikes and is reflected by the diffraction grating 11. Both the diffracted beam Lb1 and the diffracted beam Lb2 show an angle of diffraction of 6 as viewed along the direction of the lattice vector as shown in FIG. 18. In other words, both the diffracted beam Lb1 and the diffracted beam Lb2 are produced along the inclined plane m3. Both the diffracted beam Lb1 and the diffracted beam Lb2 show an angle of diffraction of $\beta$ on the inclined plane m3. Note that the diffracted beam Lb1 and the diffracted beam Lb2 leave the diffraction grating 11 in opposite directions as viewed along the lattice vector direction.

As shown in FIGS. 16 and 19, the optical displacement measurement system 40 comprises a light receiving element 13 adapted to receive the two diffracted beams Lb1, Lb2 that are interfering with each other and generate an interference signal and a light receiving optical system 42 adapted to cause the diffracted beam Lb1 and the diffracted beam Lb2 to interfere with each other before striking the light receiving element 13.

The light receiving optical system 42 comprises a reflector 25 for reflecting the diffracted beam Lb1 produced from the coherent beam La1, another reflector 26 for reflecting the diffracted beam Lb2 produced from the coherent beam La2, a half mirror 27 for causing the diffracted beam reflected by the reflector 25 and the diffracted beam Lb2 reflected by the reflector 26 to overlap and interfere with each other and a second focussing element 28 for focussing the two diffracted beams Lb1, Lb2 that are made to overlap and interfere with each other by the half mirror 27 on the light receiving plane 13a of the light receiving element 13.

In view of the fact that the two diffracted beams Lb1, Lb2 show an angle of diffraction of $\delta$ as viewed along the lattice vector direction, the components of the light receiving optical system 4 are arranged in such a way that the optical paths of the diffracted beams Lb1, Lb2 are formed on the inclined plane m3. Additionally, the reflector 25 and the reflector 26 of the light receiving optical system 42 are arranged respectively at positions where they can reflect the diffracted beams Lb1, Lb2 that are diffracted by an angle of diffraction of $\delta$ on the inclined plane m3.

The optical displacement measurement system 40 additionally comprises a position detecting section (not shown) for detecting the displaced position of the diffraction grating 11 on the basis of the interference signal from the light receiving element 13.

With an optical displacement measurement system 40 having a configuration as described above, a phase difference is produced between the two diffracted beams Lb1, Lb2 as the diffraction grating 11 is moved in the directions of the lattice vector with a movement of the movable part of the machine tool. Then, the optical displacement measurement system 10 causes the two diffracted beams Lb1, Lb2 to interfere with each other to detect an interference signal and determines the phase difference of the two diffracted beams Lb1 , Lb2 from the interference signal to finally detect the displaced position of the diffraction grating 11.

With the above described optical displacement measurement system 40, the optical paths of incident beams and those of diffracted beams can be separated from each other by arranging an irradiation optical system 41 on inclined plane m2 showing a predetermined angle of inclination relative to reference plane m1 and a light receiving optical system 42 on inclined plane m3 to allow an enhanced degree of freedom for designing the system configuration. Additionally, the diffracted beams Lb1, Lb2 can be made to interfere with each other without allowing any diffracted beams of the 0-th degree or reflected beams to stray into the irradiation optical system 41 or the light receiving optical system 42. Thus, this embodiment can minimize noises and the displaced position of the movable part of the machine tool can be detected accurately with an enhanced degree of resolution.

The requirements to be met to eliminate any diffracted beams or reflected beams trying to stray into the irradiation optical system 41 or the light receiving optical system 42 of the optical displacement measurement system 40 are as follows.

If the angle of incidence $\alpha$ and the angle of diffraction $\beta$ are equal relative to each other, the coherent beam La1 and the coherent beam La2 are made to strike the diffraction grating 11 at respective spots separated by distance 1 that would not allow any diffracted beams of the 0-th degree to irradiate the light receiving element 13. While the coherent beam La1 and the coherent beam La2 may be made to strike the diffraction grating 11 at respective spots separated along the lattice vector direction, they may alternatively be made to strike the diffraction grating 11 at respective spots separated by a predetermined distance along the lattice direction as shown in FIG. 20. If one of the opposite ends of the diffraction grating 11 as viewed in the lattice vector directions is moved in one of the normal vector directions (the direction indicated by arrow X3 in FIG. 20) and the other end is moved in the other normal vector direction (the direction indicated by arrow X4 in FIG. 20) to tilt the lattice plane 11a, the focussed positions of the two diffracted beams Lb1, Lb2 on the light receiving plane 13a of the light receiving element 13 would not be displaced.

Figure 21:
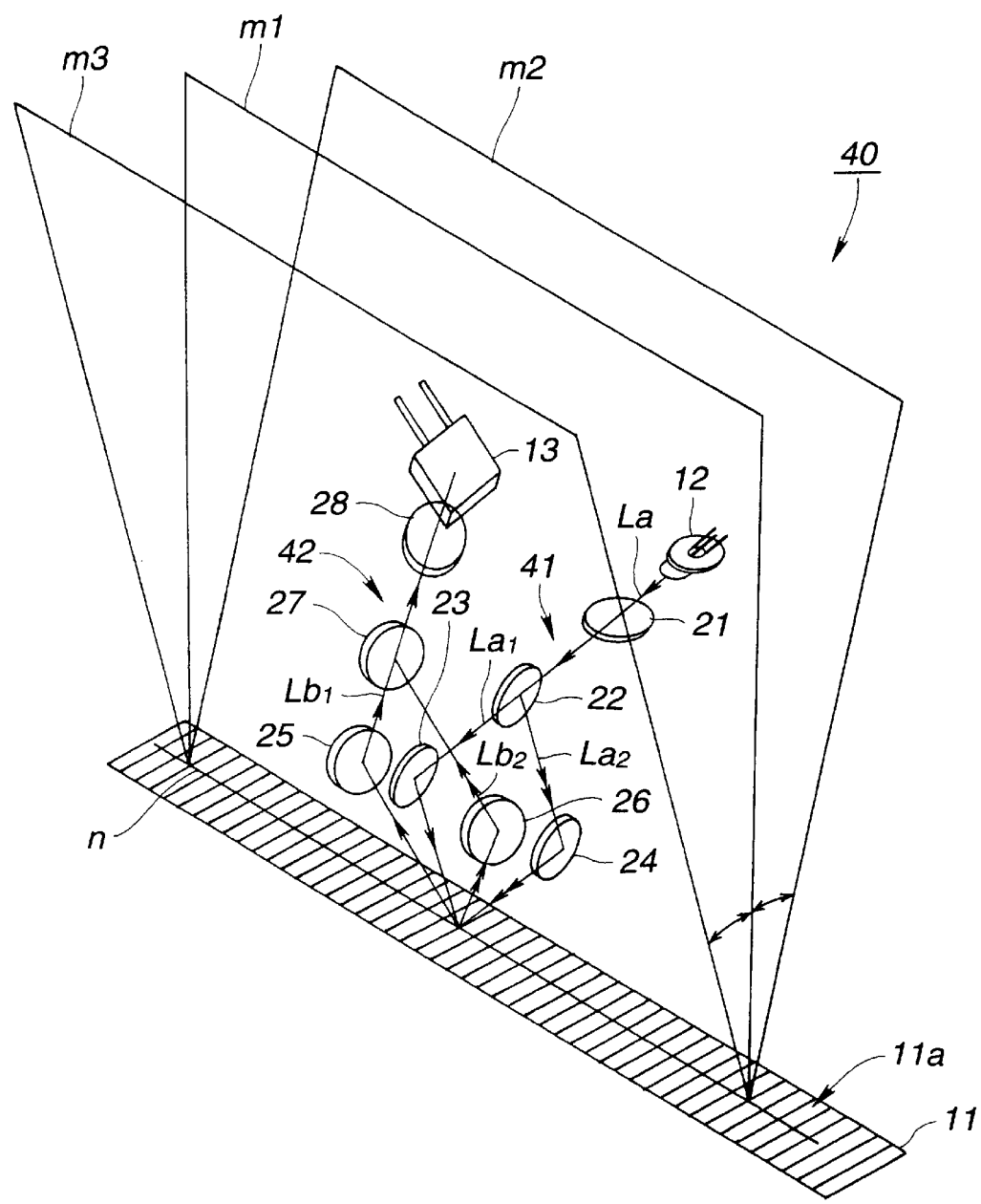
FIG. 21 is a schematic illustration of the spots different from that of FIG. 20 where coherent beams strike the diffraction grating of the third embodiment.
Figure 22:
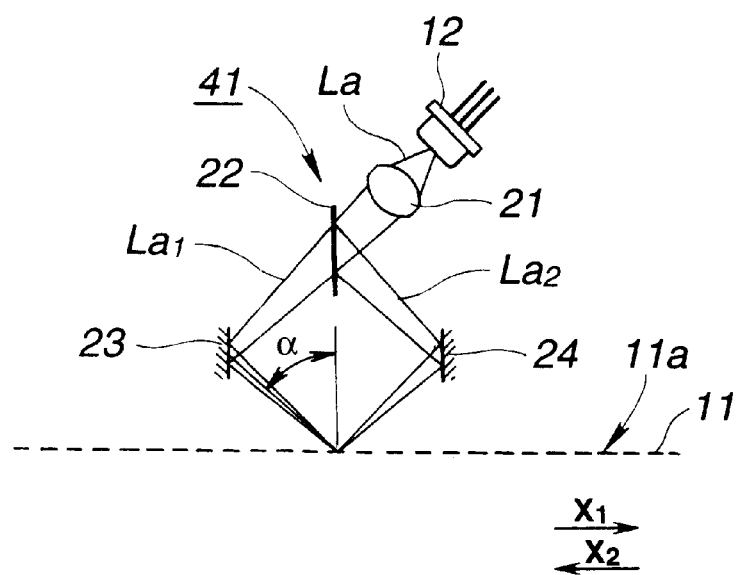
FIG. 22 is a schematic view similar to FIG. 17 showing the component of the third embodiment of optical displacement measurement system arranged on slope m2 and viewed along a direction perpendicular relative to the slope m2 but the spot where the coherent beams strike differs from that of FIG. 17.
Figure 23:
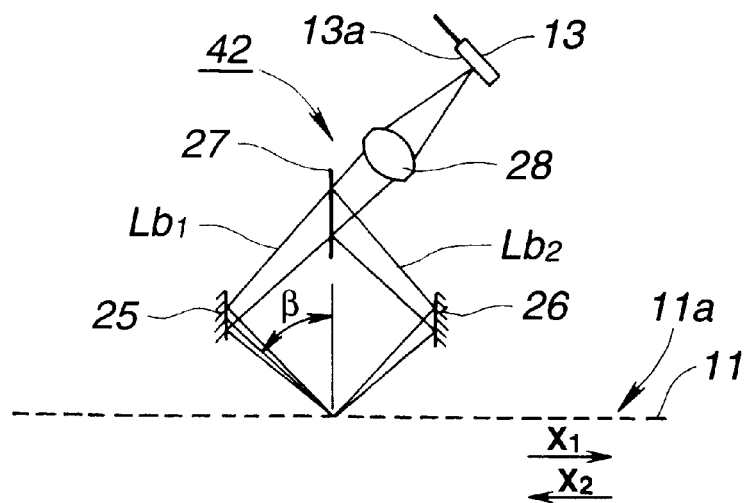
FIG. 23 is a schematic view similar to FIG. 19 showing the component of the third embodiment of optical displacement measurement system arranged on slope m3 and viewed along a direction perpendicular relative to the slope m3 but the spot where the coherent beams strike a spot differs from that of FIG. 19.

If the angle γ is such that the beam reflected by the diffraction grating 11 does not enter the aperture of the focussing element 21 and any diffracted beams of the 0-th degree enter the aperture of the second focussing element 28 with angle of incidence α differing from angle of diffraction β, a same spot (1=0) may be selected for both the coherent beam La1 and the coherent beam La2 to strike the diffraction grating 11 as shown in FIGS. 21, 22 and 23. If such is the case, no significant difference is produced between the length of the light path of the coherent beam La1 and that of the coherent beam La2 under the influence of variations in the thickness and the refractive index of the diffraction grating 11 if compared with the case where the spots at which the coherent beam La1 and the coherent beam La2 respectively strike the diffraction grating 11 are separated by a predetermined distance so that the displaced position of the movable part can be determined highly accurately.

Now, the influence of possible variations in the thickness of the diffraction grating 11 will be discussed below.

Assume that the two diffracted beams to be made to overlap with each other have respective intensities of A1, A2 and the displacement of the diffraction grating 11 in the lattice vector direction is x, while the initial phase is δ, then the intensity I of the interference signal detected by the light receiving element 13 will be expressed by formula (1) below:

$$I = A_1^2 + A_2^2 + 2A_1 A_2 \cos(4Kx + \delta) \quad (1)$$

where K=2π/Λ (Λ being the lattice pitch)

The intensity I is transformed for every cycle period as the diffraction grating 11 is moved by Λ/4. δ represents a quantity that varies depending on the difference of the lengths of the optical paths of the doubly diffracted beams Lc1, Lc2. Therefore, if δ varies, the intensity I of the interference signal changes to give rise to an error if the diffraction grating 11 is not shifted.

Figure 24:
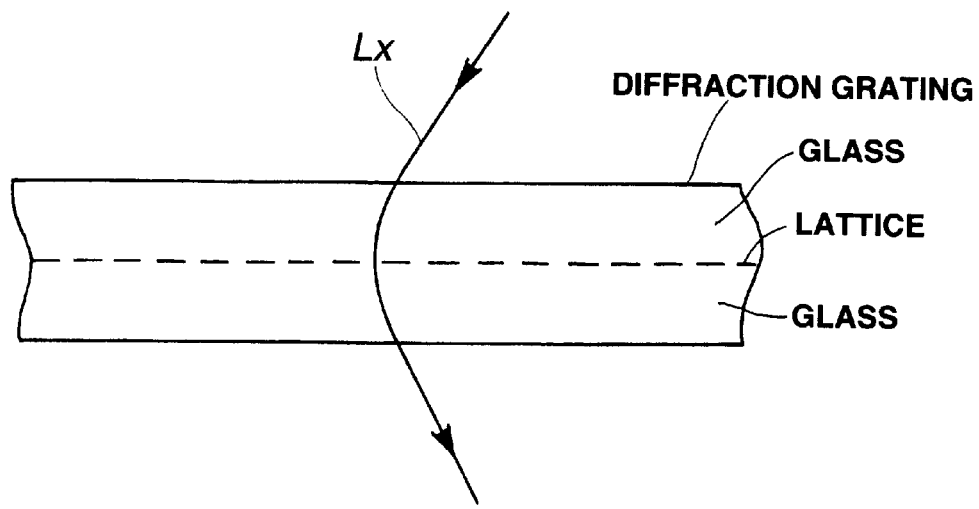
FIG. 24 is a schematic illustration of the length of the optical path of a laser beam passing through a diffraction grating.
Figure 25:
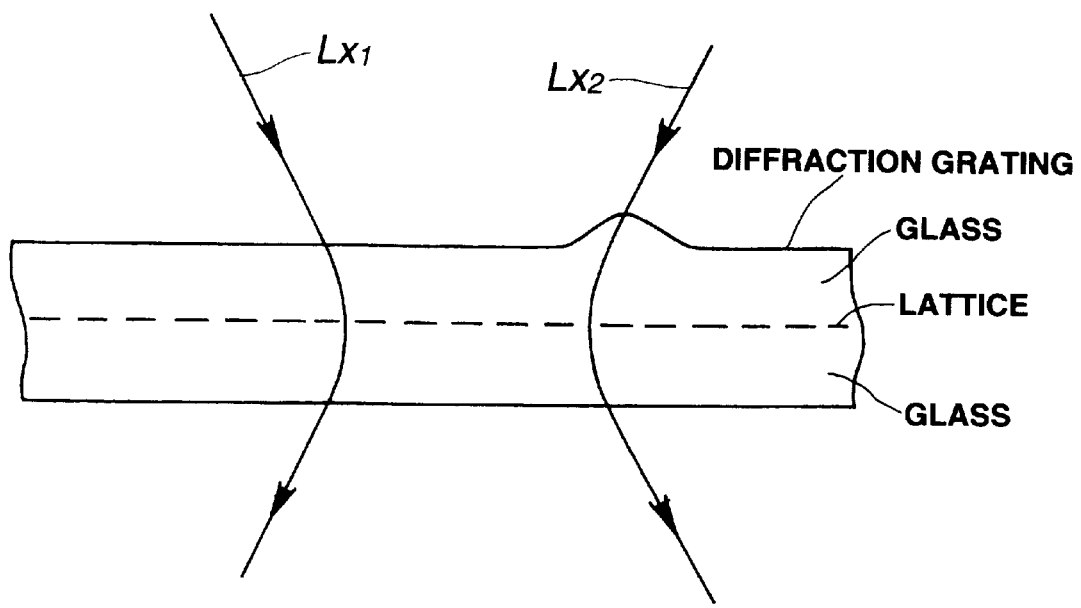
FIG. 25 is a schematic illustration of the difference between the optical paths of two laser beams passign through a diffraction grating when the latter has a varying thickness.

Assume, for example, that the transmission type diffraction grating containing a latticework formed inside a piece of glass as shown in FIG. 24 has a thickness that fluctuates. If the refractive index of the glass is n and the distance by which laser beam Lx travels to cross the piece of glass from a surface to the opposite surface thereof is L, then the length of the optical path of the laser beam Lx will be nL when it passes through the diffraction grating. Since the refractive index of air is substantially equal to 1, the length of the light path of the laser beam Lx when passing through the diffraction grating will be longer than that of the laser beam Lx travelling through air by (n-1)L. Thus, if the thickness of the piece of glass of the diffraction grating fluctuates to change the distance by which the laser beam Lx travels to cross the piece of glass from a surface to the opposite surface thereof to L+αL, then the length of the light path of the laser beam is changed by (n-1)αL.

Keeping this in mind, imagine a pair of laser beams Lx1 and Lx2, of which the laser beam Lx1 passes through a diffraction grating at a position free from fluctuations in the thickness whereas the laser beam Lx2 passes through the diffraction grating at a position where the thickness fluctuates. If the laser beam Lx2 travels through the diffraction grating longer than the laser beam Lx1 by a distance +αL, then the difference between the lengths of the optical paths of the two laser beams Lx1, Lx2 is (n-1)αL. Therefore, the value of δ of formula (1) above is varied by {(n-1)αL}·2π/λ (where λ represents the wavelength of beams A and B) to give rise to an error in the interference signal. The amount of error in terms of the detected position is expressed by (Λ/2λ) (n-1)αL. If ζ=0.55 μm and λ=0.78 μm while n=1.5 and αL=1 μm, the variation in the value of δ will be about 0.18 μm, which is substantially large when the position of the movable part is to be detected to a degree of accuracy of nanometers.

Thus, if the diffraction grating 11 shows fluctuations in the thickness, errors can occur when the spots at which the coherent beam La1 and the coherent beam La2 respectively enter the diffraction grating 11 are separated by a predetermined distance.

Errors attributable to the fluctuations in the thickness and the refractive index of the diffraction grating 11 can be minimized to make the optical displacement measurement system capable of detecting the position of the movable part highly accurately by arranging the irradiation optical system 41 on an inclined plane m2 tilted by a predetermined angle of inclination relative to reference plane 2m1 while arranging the light receiving optical system 42 on an inclined plane m3 and causing both the coherent beam La1 and the coherent beam La2 to enter the diffraction grating 11 at a same and identical spot. In other words, errors attributable to fluctuations in the thickness and/or the refractive index of the diffraction grating 11 can occur when the coherent beam La1 and the coherent beam La2 enter the diffraction grating 11 at respective spots that are different from each other and, therefore, the position of the movable part can be detected highly accurately by causing both the coherent beam La1 and the coherent beam La2 to enter the diffraction grating 11 at a same and identical spot. While it may be difficult to cause the two diffracted beams La1, La2 to exactly follow a same and identical light path when the diffraction grating 11 is covered by glass, the difference between the lengths of the two light paths can be minimized by making them enter the diffraction grating 11 at a same and identical spot.

The relationship among the angles of incidence α, γ of the coherent beams and the angle of diffraction β, δ of the diffracted beams is expressed by formulas (2) and (3) below.

$$\sin\alpha + \sin\beta = m\lambda/d \quad (2)$$

where
d: pitch of diffraction grating,
λ: wavelength of light
m: degree of diffraction $$\sin\gamma/\sin\delta = \cos\beta/\cos\alpha \quad (3)$$

Thus, if α=β, γ=δ, whereas, if α β, γ δ.

Figure 29:
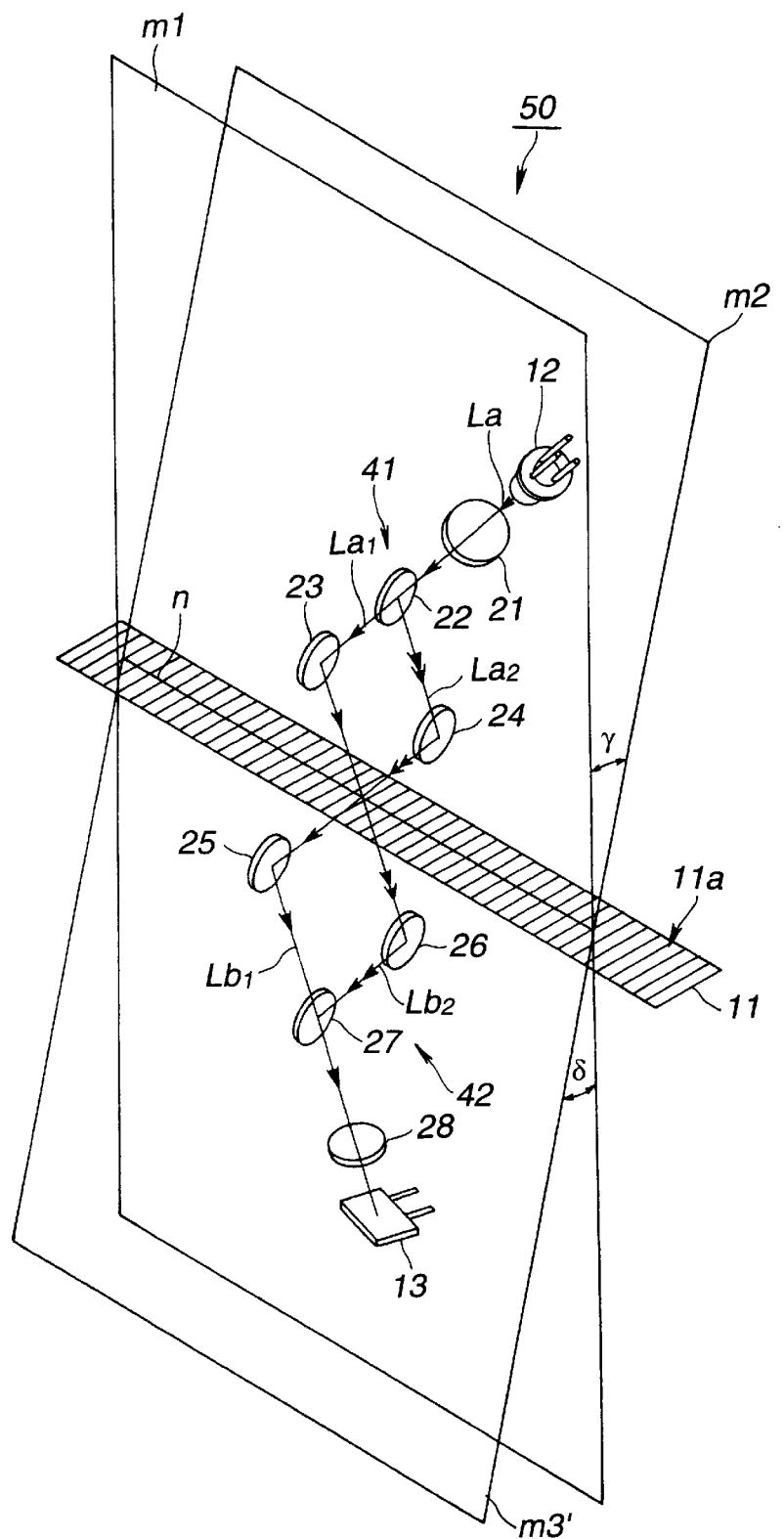
FIG. 29 is a schematic illustration of the spots different from that of FIG. 26 where coherent beams strike the diffraction grating of the fourth embodiment.
Figure 30:
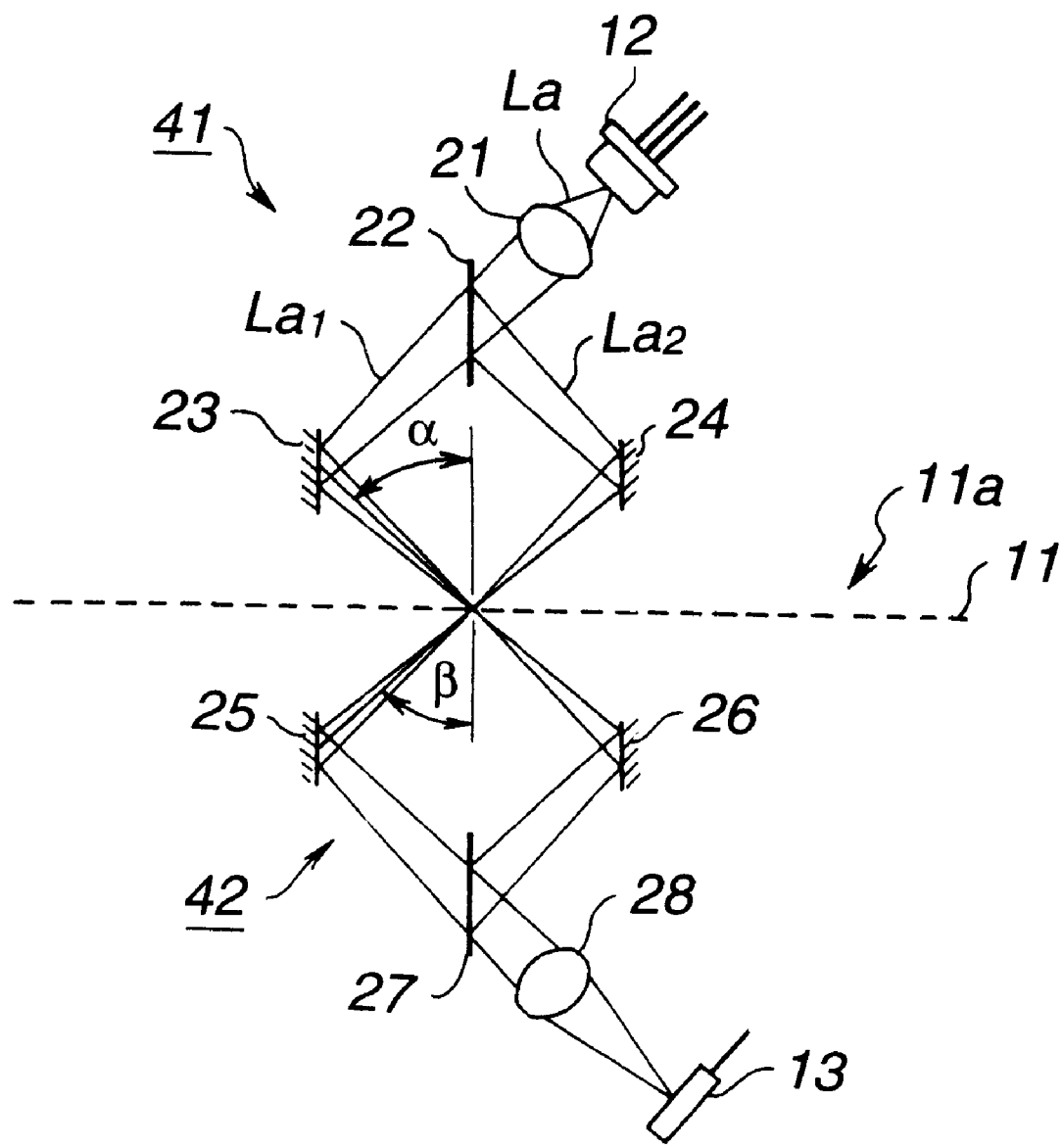
FIG. 30 a schematic view similar to FIG. 27 showing the components of the fourth embodiment of optical displacement measurement system arranged on slopes m2 and m3' and viewed along a direction perpendicular relative to the slopes m2 and m3' but the spot where the coherent beams strike differs from that of FIG. 27.

If the angle γ is such that the beam reflected by the diffraction grating 11 does not enter the aperture of the focussing element 21 and any diffracted beams of the 0-th degree enter the aperture of the second focussing element 28 with angle of incidence α differing from angle of diffraction β, a same spot (1=0) may be selected for both the coherent beam La1 and the coherent beam La2 to strike the diffraction grating 11 as shown in FIGS. 29 and 30. If such is the case, no significant difference is produced between the length of the light path of the coherent beam La1 and that of the coherent beam La2 under the influence of variations in the thickness and the refractive index of the diffraction grating 11 if compared with the case where the spots at which the coherent beam La1 and the coherent beam La2 respectively strike the diffraction grating 11 are separated by a predetermined distance so that the displaced position of the movable part can be determined highly accurately for the reason same as the one as described above by referring to the third embodiment.

Now, a fourth embodiment of optical displacement measurement system according to the present invention and comprising a transmission type diffraction grating 11 will be described below.

Figure 26:
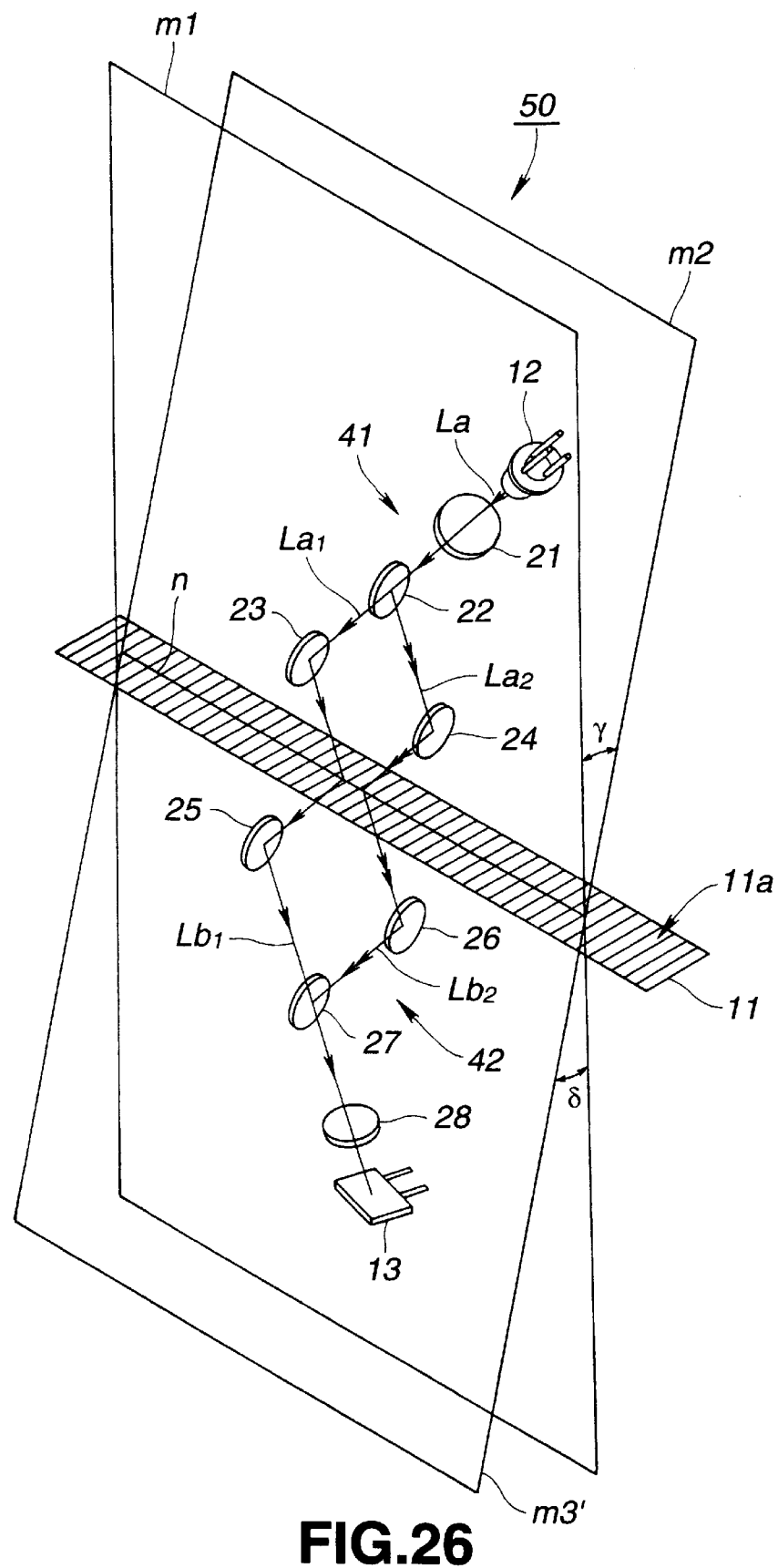
FIG. 26 is a schematic perspective view of a fourth embodiment of optical displacement measurement system according to the present invention.

FIG. 26 is a schematic perspective view of the fourth embodiment of optical displacement measurement system.

Referring to FIG. 26, the linear line n, the reference plane m1 and the inclined plane m2 are same as those of the above described third embodiment. There is also shown an imaginary plane containing the line n and tilted from the reference plane m1 by angle of inclination δ. This imaginary plane is referred to as inclined plane m3'. Note that the inclined plane m2 and the inclined plane m3' are located respectively at the opposite sides relative to the lattice plane 11a of the diffraction grating 11.

Figure 27:
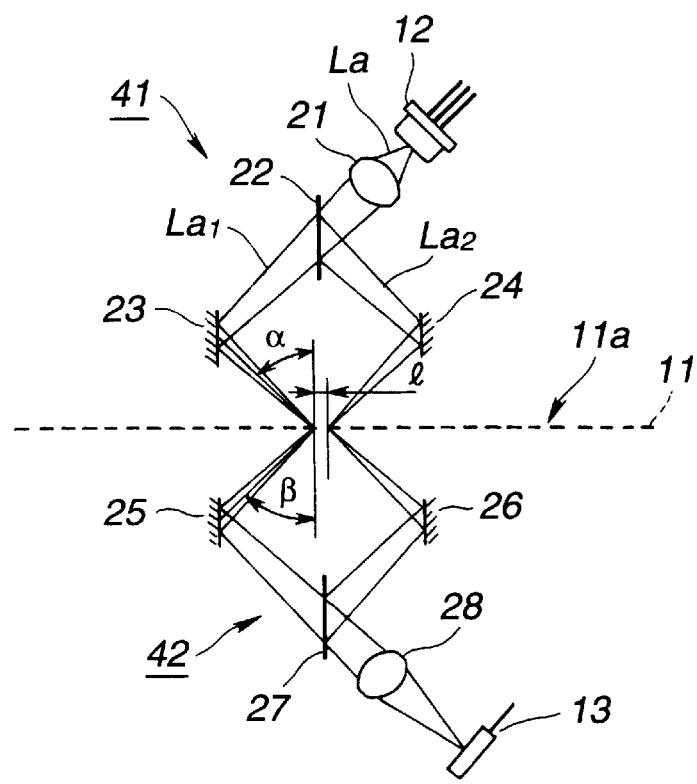
FIG. 27 is a schematic view of a components of the fourth embodiment of optical displacement measurement system arranged on slopes m2 and m3' and viewed along directions perpendicular relative to the slopes m2 and m3' respectively.
Figure 28:
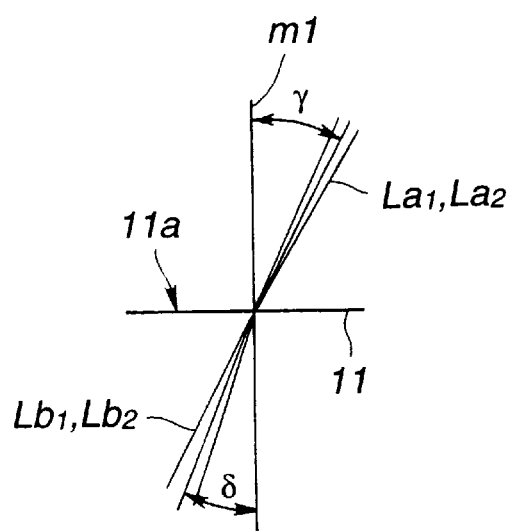
FIG. 28 is a schematic illustration of a coherent beam striking the diffraction grating and a diffracted beam diffracted by the diffraction grating of the fourth embodiment of optical displacement measurement system according to the present invention as viewed along the direction of the lattice vector.

FIG. 27 is a schematic view of the embodiment showing the components arranged on the inclined plane m2 as viewed along the direction perpendicular to the inclined plane m2 and the inclined plane m3'. FIG. 28 is a schematic illustration of a coherent beam striking the diffraction grating 11 and a diffracted beam diffracted by the diffraction grating 11 as viewed along the direction of the lattice vector.

This fourth embodiment of optical displacement measurement system comprises a transmission type diffraction grating 11 and adapted to detect the position of the movable part of a machine tool to which it is fitted.

As shown in FIGS. 26 and 27, the optical displacement measurement system 50 comprises a coherent light source 12 for emitting a coherent beam of light La and an irradiation optical system 41 adapted to divide the coherent beam La into two coherent beams La1, La2 and cause them to strike the diffraction grating 11.

The components of the irradiation optical system 41 are so arranged that the optical paths of the coherent beams La (La1, La2) passing therethrough are formed on the inclined plane m2. Therefore, the coherent beams La1, La2 show an angle of incidence of γ as viewed along the direction of the lattice vector in FIG. 28.

The reflector 23 reflects the coherent beam La1 transmitted through the half mirror 22 and makes it strike the lattice plane 11a of the diffraction grating 11 at a predetenmined spot. The reflector 24, on the other hand, reflects the coherent beam La2 reflected by the half mirror 22 and makes it strike the lattice plane 11a of the diffraction grating 1 at the predetenmined spot. The reflector 23 and the reflector 24 make the respective coherent beams La1 and La2 strike predetermined respective spots on the lattice plane 11a in such a way that they show an angle of incidence of a on the inclined plane m2. The coherent beam L1a and the coherent beam La2 are directed oppositely in terms of the lattice vector direction. The distance between the spot at which the coherent beam La1 enters the lattice plane 11a and the spot at which the coherent beam La2 enters the lattice plane 11a is 1.

With the optical displacement measurement system 50, the coherent beam La1 is diffracted as it enters the diffraction grating 11 and a diffracted beam Lb1 is produced from the spot where the coherent beam La1 enters and is transmitted through the diffraction grating 11. Also, the coherent beam La2 is diffracted as it enters the diffraction grating 11 and a diffracted beam Lb2 is produced from the spot where the coherent beam La2 enters and is transmitted through the diffraction grating 11. Both the diffracted beam Lb1 and the diffracted beam Lb2 show an angle of diffraction of δ as viewed along the direction of the lattice vector as shown in FIG. 28. In other words, both the diffracted beam Lb1 and the diffracted beam Lb2 are produced along the inclined plane m3'. Both the diffracted beam Lb1 and the diffracted beam Lb2 show an angle of diffraction of on the inclined plane m3'. Note that the diffracted beam Lb1 and the diffracted beam Lb2 leave the diffraction grating 11 in opposite directions as viewed along the lattice vector direction.

As shown in FIGS. 26 and 27, the optical displacement measurement system 50 comprises a light receiving element 13 adapted to receive the two diffracted beams Lb1, Lb2 that are interfering with each other and generate an interference signal and a light receiving optical system 42 adapted to cause the diffracted beam Lb1 and the diffracted beam Lb2 to interfere with each other before striking the light receiving element 13.

In view of the fact that the two diffracted beams Lb1, Lb2 show an angle of diffraction of δ as viewed along the lattice vector direction, the components of the light receiving optical system 4 are arranged in such a way that the optical paths of the diffracted beams Lb1, Lb2 are formed on the inclined plane m3'. Additionally, the reflector 25 and the reflector 26 of the light receiving optical system 42 are arranged respectively at positions where they can reflect the diffracted beams Lb1, Lb2 that are diffracted by an angle of diffraction of δ on the inclined plane m3'.

The optical displacement measurement system 50 additionally comprises a position detecting section (not shown) for detecting the displaced position of the diffraction grating 11 on the basis of the interference signal from the light receiving element 13.

With an optical displacement measurement system 50 having a configuration as described above, a phase difference is produced between the two diffracted beams Lb1, Lb2 as the diffraction grating 11 is moved in the directions of the lattice vector with a movement of the movable part of the machine tool. Then, the optical displacement measurement system 10 causes the two diffracted beams Lb1, Lb2 to interfere with each other to detect an interference signal and determines the phase difference of the two diffracted beams Lb1, Lb2 from the interference signal to finally detect the displaced position of the diffraction grating 11.

With the above described optical displacement measurement system 50, the optical paths of incident beams and those of diffracted beams can be separated from each other by arranging an irradiation optical system 41 on inclined plane m2 showing a predetermined angle of inclination relative to reference plane m1 and a light receiving optical system 42 on inclined plane m3' to allow an enhanced degree of freedom for designing the system configuration. Additionally, the diffracted beams Lb1, Lb2 can be made to interfere with each other without allowing any diffracted beams of the 0-th degree or reflected beams to stray into the irradiation optical system 41 or the light receiving optical system 42. Thus, this embodiment can minimize noises and the displaced position of the movable part of the machine tool can be detected accurately with an enhanced degree of resolution.

The requirements to be met to eliminate any diffracted beams or reflected beams trying to stray into the irradiation optical system 41 or the light receiving optical system 42 of the optical displacement measurement system 40 are same as those described above by referring to the third embodiment particularly in terms of the relationship among the angles of incidence α and γ and the angles of diffraction β and δ.

Figure 31:
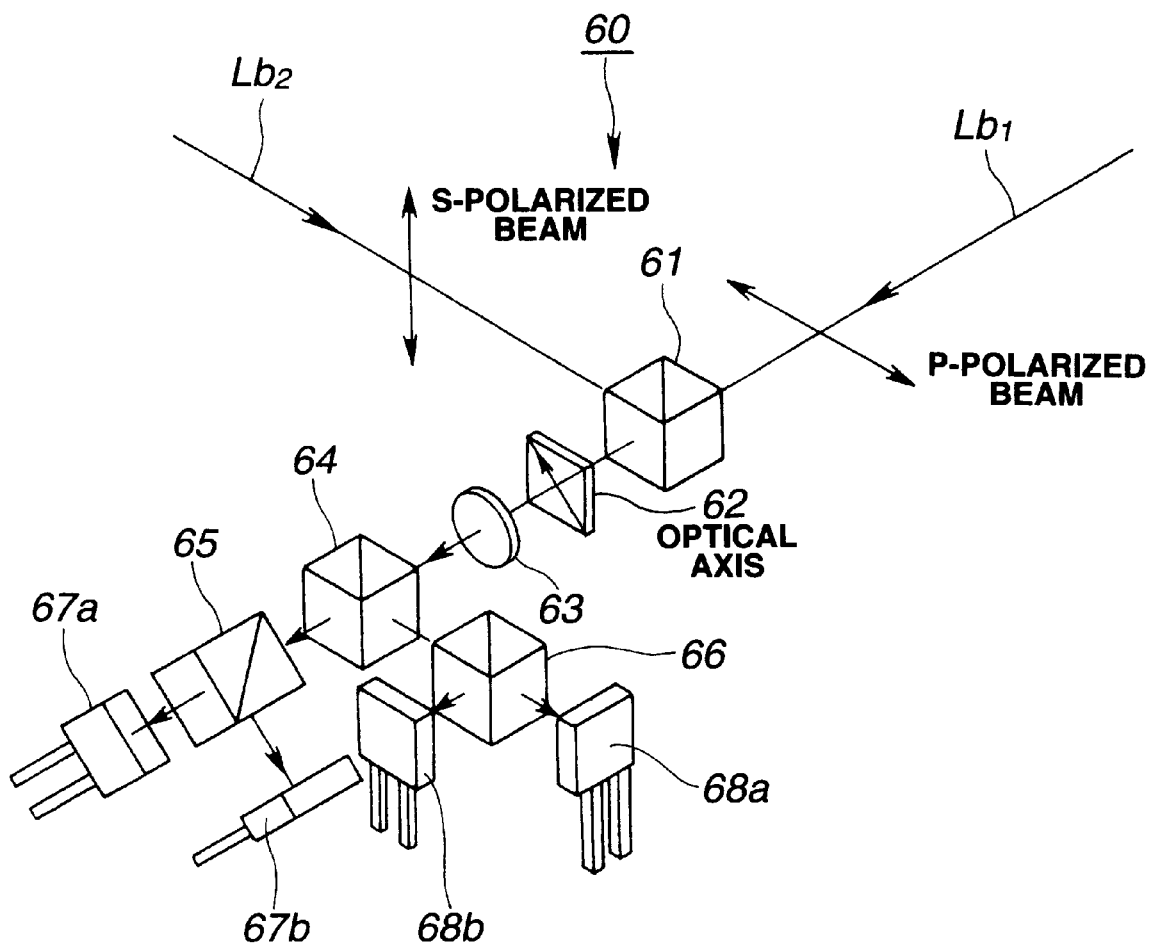
FIG. 31 is a schematic perspective view of a fifth embodiment of optical displacement measurement system according to the present invention, schematically illustrating a principal portion of the light receiving optical system thereof.

Now, a fifth embodiment of optical displacement measurement system according to the present invention will be described below by referring to FIG. 31. Note that the components of the fifth embodiment of optical displacement measurement system are obtained by partly modifying some of the components of the third and fourth embodiments and hence the components that are same as or similar to the counterparts of the above described third and fourth embodiments will be denoted respectively by the same reference symbols and will not be described any further.

The fifth embodiment of optical displacement measurement system 60 uses a polarized beam splitter for the half mirror 22 of the irradiation optical system 41. Therefore, the half mirror 22 will be referred to as polarized beam splitter 22 in the following description on the fifth embodiment.

In the optical displacement measurement system 60, the half mirror 27 and the second focussing element 28 of the light receiving optical system 42 are replaced by a first polarized beam splitter 61, a ¼ wave plate 62, a third focussing element 63, a non-polarized beam splitter 64, a second polarized beam splitter 65 and a third polarized beam splitter 66.

In the optical displacement measurement system 60, the light receiving element 13 is replaced by a first pair of light receiving elements 67a, 67b and a second pair of light receiving elements 68a, 68b.

The coherent beam La emitted from the coherent light source 12 is made to enter the polarized beam splitter 22 of the irradiation optical system 41 with an angle of inclination of 45 degree. The polarized beam splitter 22 of the irradiation optical system 41 divides the incident coherent beam La into two coherent beams La1, La2 that are polarized in respective senses perpendicular relative to each other. The coherent beam La1 transmitted through the polarized beam splitter 22 of the irradiation optical system 41 becomes a P-polarized beam, whereas the coherent beam La2 reflected by the polarized beam splitter 22 becomes an S-polarized beam.

The diffracted beam Lb2 diffracted by the diffraction grating 11 and the diffracted beam Lb2 also diffracted by the diffraction grating 11 are made to enter the first polarized beam splitter 61 of the light receiving optical system 42. Thus, the diffracted beam Lb1 becomes a P-polarized beam whereas the diffracted beam Lb2 becomes an S-polarized beam. Then, the polarized beam splitter 61 causes the two diffracted beams Lb1, Lb2 to overlap with each other by transmitting the diffracted beam Lb1 and reflecting the diffracted beam Lb2.

The two diffracted beams Lb1 , Lb2 that are overlapping with each other are then made to pass through the ¼ wave plate 62. The ¼ wave plate 62 is arranged with its optical axis inclined by 45 degree relative to the sense of polarization of each of the diffracted beams Lb1, Lb2. Thus, the diffracted beams Lb1, Lb2 become circularly polarized beams that are polarized in opposite senses when they pass the ¼ wave plate 62.

The diffracted beams Lb1, Lb2 that are circularly polarized in opposite senses are then made to pass through the third focussing element 63.

The third focussing element 63 comprises an optical element such as a lens having a predetermined variable range of numerical aperture. The third focussing element 63 focusses the diffracted beams Lb1, Lb2 on the light receiving planes of the first pair of light receiving elements 67a, 67b and the second pair of light receiving elements 68a, 68b. The focal point may not necessarily be the point where the beam diameter is minimized. A point on the light receiving planes that minimizes the difference of the lengths of the optical paths of beams may alternatively be selected for the focal point.

After passing through the third focussing element 63, each of the diffracted beams Lb1, Lb2 is split into two beams by the non-polarized beam splitter 64.

One of the obtained two beams is further split into two beams that are polarized in respective senses perpendicular relative to each other by the second polarized beam splitter 65. Then, they are made to enter the first pair of light receiving elements 67a, 67b. The other one of the obtained two beams is also split into two beams that are polarized in respective senses perpendicular relative to each other by the third polarized beam splitter 66 that is tilted by 45 degree relative to the second polarized beam splitter 65. Then, they are made to enter the second pair of light receiving elements 68a, 68b.

The beam of light obtained by overlapping circularly polarized beams revolving in opposite senses can be regarded as linearly polarized beam revolving as a function of the phase difference of the two beams. Therefore, the diffracted beam will become a linearly polarized beam that revolves in response to the movement of the diffraction grating 11. Additionally, when the component beams of the linearly polarized beam that are differentiated by ω degree are taken out by a polarizing element such as a polarizing plate, the signals detecting the intensities of the taken out component beams will show a phase difference of 2ω. Thus, since the first pair of light receiving elements 67a, 67b detect the beams polarized in respective senses that are different from each other by 90 degree and taken out by the second polarized beam splitter 65, the detected signals show a phase difference of 180 degree. Therefore, signals deprived of the respective DC components can be detected by determining the difference of the signals detected by the first pari of light receiving elements 67a, 67b. It will be appreciated that the above description also applies to the second pair of light receiving elements 68a, 68b.

Furthermore, the beams taken out by the third polarized beam splitter 66 shows an angular difference of 45 degree relative to the beams taken out by the second polarized beam splitter 65. Therefore, the signals obtained from the second pair of light receiving elements 68a, 68b shows a phase difference of 90 degree relative to the signals obtained from the first pair of light receiving elements 67a, 67b. In other words, the differential signal of the signals detected by the first pair of light receiving elements 67a, 67b and the differential signal of the signals detected by the second pair of light receiving elements 68a, 68b show a phase difference of 90 degree relative to each other. Thus, the moving direction of the diffraction grating 11 can be determined on the basis of the position signals showing a phase difference of 90 degree and indicating the displaced position of the diffraction grating 11.

As described above, the fifth embodiment of optical displacement measurement system 60 can eliminate the influence of the transmittivity, the reflectivity and the diffraction efficiency of the diffraction grating 11 from the detected interference signal. Additionally, the optical displacement measurement system 60 can determine the moving direction of the diffraction grating 11.

Now, a sixth embodiment of optical displacement measurement system according to the invention will be described by referring to FIG. 32. Note that the components of the sixth embodiment of optical displacement measurement system are obtained by partly modifying some of the components of the fifth embodiment and hence the components that are same as or similar to the counterparts of the above described fifth embodiment will be denoted respectively by the same reference symbols and will not be described any further.

The sixth embodiment of optical displacement measurement system 70 uses a polarized beam splitter for the half mirror 22 of the irradiation optical system 41.

Therefore, the half mirror 22 will be referred to as polarized beam splitter 22 in the following description on the sixth embodiment.

Figure 32:
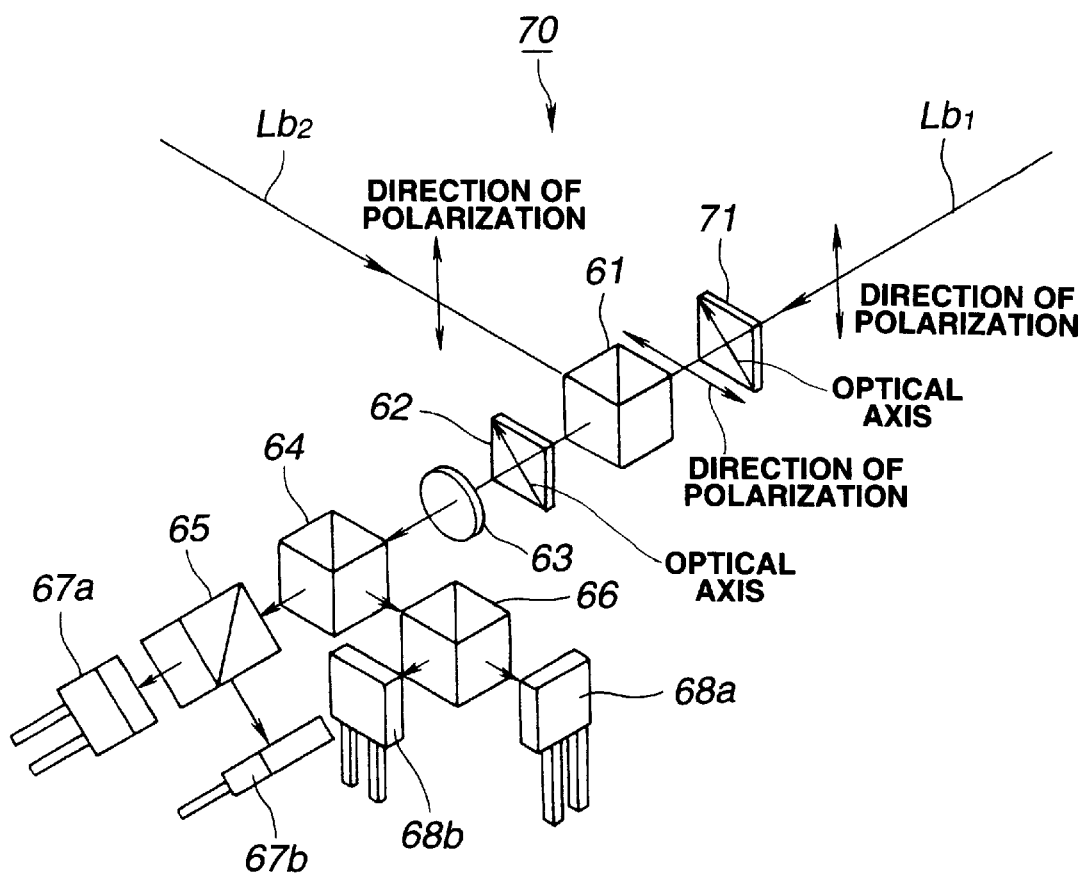
FIG. 32 is a schematic perspective view of a sixth embodiment of optical displacement measurement system according to the present invention, schematically illustrating a principal portion of the light receiving optical system thereof.

As shown in FIG. 32, the optical displacement measurement system 70 comprises a ¼ wave plate 71 for turning the sense of polarization of one of the diffracted beams entering the first polarized beam splitter 61 by 90 degree.

The coherent beam La emitted from the coherent light source 12 is S-polarized before entering the non-polarized beam splitter 22 of the irradiation optical system 41. The non-polarized beam splitter 22 of the irradiation optical system 41 splits the incident coherent beam La into two coherent beams La1, La2 that are polarized in a same sense.

The diffracted beam Lb1 and the diffracted beam Lb2 diffracted by the diffraction grating 11 are polarized in a same sense at the time of diffraction. One of the diffracted beams, or the diffracted beam Lb1, passes through the ¼ wave plate that rotates the sense of polarization by 90 degree before entering the first polarized beam splitter 61. The other diffracted beam, the diffracted beam Lb2, enters the first polarized beam splitter 61 of the light receiving optical system 42 with the original sense of polarization.

Thus, the two diffracted beams Lb1, Lb2 differentiated by 90 degree relative to each other in terms of sense of polarization enter the first polarized beam splitter 61 of the light receiving optical system 42. Note that the diffracted beam Lb1 is P-polarized whereas the diffracted beam Lb2 is S-polarized. The polarized beam splitter 61 causes the two diffracted beams Lb1, Lb2 to overlap with each other by transmitting the diffracted beam Lb1 and reflecting the diffracted beam Lb2. If a P-polarized coherent beam La is made to enter the non-polarized beam splitter 22, the ¼ wave plate 71 may be arranged on the side of the diffracted beam Lb2.

The two diffracted beams Lb1, Lb2 that are overlapping with each other are then made to pass through the ¼ wave plate 62. The ¼ wave plate 62 is arranged with its optical axis inclined by 45 degree relative to the sense of polarization of each of the diffracted beams Lb1, Lb2. Thus, the diffracted beams Lb1, Lb2 become circularly polarized beams that are polarized in opposite senses when they pass the ¼ wave plate 62.

The diffracted beams Lb1, Lb2 that are circularly polarized in opposite senses are then made to pass through the third focussing element 63. The third focussing element 63 focusses the diffracted beams Lb1, Lb2 on the light receiving planes of the first pair of light receiving elements 67a, 67b and those of the second pair of light receiving elements 68a, 68b with a predetermined beam diameter.

After passing through the third focussing element 63, each of the diffracted beams Lb1, Lb2 is split into two beams by the non-polarized beam splitter 64.

One of the obtained two beams is further split into two beams that are polarized in respective senses perpendicular relative to each other by the second polarized beam splitter 65. Then, they are made to enter the first pair of light receiving elements 67a, 67b. The other one of the obtained two beams is also split into two beams that are polarized in respective senses perpendicular relative to each other by the third polarized beam splitter 66 that is tilted by 45 degree relative to the second polarized beam splitter 65. Then, they are made to enter the second pair of light receiving elements 68a, 68b.

As described above, the sixth embodiment of optical displacement measurement system 70 can eliminate the influence of the transmittivity, the reflectivity and the diffraction efficiency of the diffraction grating 11 from the detected interference signal. Additionally, the optical displacement measurement system 60 can determine the moving direction of the diffraction grating 11.

Now, a seventh embodiment of optical displacement measurement system according to the invention will be described by referring to FIG. 33. Note that the components of the seventh embodiment of optical displacement measurement system are obtained by partly modifying some of the components of the fifth embodiment and hence the components that are same as or similar to the counterparts of the above described fifth embodiment will be denoted respectively by the same reference symbols and will not be described any further.

The seventh embodiment of optical displacement measurement system 80 uses a polarized beam splitter for the half mirror 22 of the irradiation optical system 41. Therefore, the half mirror 22 will be referred to as polarized beam splitter 22 in the following description on the seventh embodiment.

Figure 33:
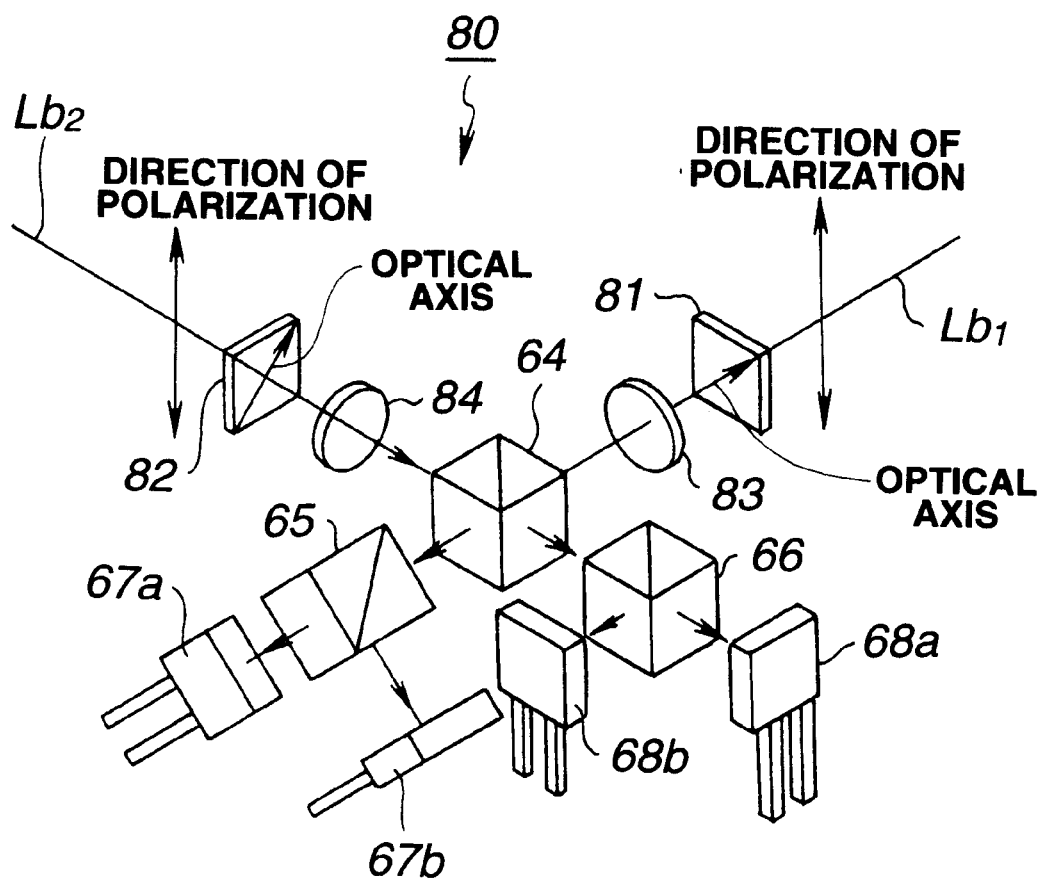
FIG. 33 is a schematic perspective view of a seventh embodiment of optical displacement measurement system according to the present invention, schematically illustrating a principal portion of the light receiving optical system thereof.

As shown in FIG. 33, in the optical displacement measurement system 80, the ¼ wave plate 71 of the light receiving optical system 42, the polarized beam splitter 61, the ¼ wave plate 62 and the third focussing element 63 are replaced respectively by a first ¼ wave plate 81, a second ¼ wave plate 82, a fourth focussing element 83 and a fifth focussing element 84.

The coherent beam La emitted from the coherent light source 12 is entered into the non-polarized beam splitter 22 of the irradiation optical system 41. The non-polarized beam splitter 22 of the irradiation optical system 41 splits the incident coherent beam La into two coherent beams La1, La2 that are polarized in a same sense.

The diffracted beam Lb1 and the diffracted beam Lb2 diffracted by the diffraction grating 11 are polarized in a same sense at the time of diffraction. One of the diffracted beams, or the diffracted beam Lb1, passes through the first ¼ wave plate 81, maintaining the original sense of polarization. Note that the first ¼ wave plate 81 has its optical axis inclined by 45 degree relative to the sense of polarization of the incident diffracted beam Lb1. Therefore, the diffracted beam Lb1 becomes a circularly polarized beam rotated in a predetermined sense of rotation.

The diffracted beam Lb1 that is circularly polarized passes through the fourth focussing element 83. The fourth focussing element 83 typically comprises an optical element such as a lense having a variable range of numerical aperture. The fourth focussing element 83 focusses the diffracted beam Lb1 on the light receiving planes of the first pair of light receiving elements 67a, 67b and the second pair of light receiving elements 68a, 68b. The focal point may not necessarily be the point where the beam diameter is minimized. A point on the light receiving planes that minimizes the difference of the lengths of the optical paths of beams may alternatively be selected for the focal point.

The other diffracted beams, or the diffracted beam Lb2, passes through the first ¼ wave plate 82 of the light receiving optical system 42, maintaining the original sense of polarization. Note that the first ¼ wave plate 82 has its optical axis inclined by 45 degree relative to the sense of polarization of the incident diffracted beam Lb2. Therefore, the diffracted beam Lb2 becomes a circularly polarized beam rotated in a predetermined sense of rotation.

The diffracted beam Lb2 that is circularly polarized passes through the fifth focussing element 84. The fifth focussing element 84 typically comprises an optical element such as a lense having a variable range of numerical aperture. The fifth focussing element 8r focusses the diffracted beam Lb2 on the light receiving planes of the first pair of light receiving elements 67a, 67b and the second pair of light receiving elements 68a, 68b. The focal point may not necessarily be the point where the beam diameter is minimized. A point on the light receiving planes that minimizes the difference of the lengths of the optical paths of beams may alternatively be selected for the focal point.

The diffracted beams Lb1, Lb2 that are circularly polarized in opposite senses then pass through the fourth focussing element 83 and the fifth focussing element 84 before entering the non-polarized beam splitter 64.

The non-polarized beam splitter 64 causes the two incident diffracted beams Lb1, Lb2 to overlap with each other and split each of them into two beams.

One of the obtained two beams is further split into two beams that are polarized in respective senses perpendicular relative to each other by the second polarized beam splitter 65. Then, they are made to enter the first pair of light receiving elements 67a, 67b. The other one of the obtained two beams is also split into two beams that are polarized in respective senses perpendicular relative to each other by the third polarized beam splitter 66 that is tilted by 45 degree relative to the second polarized beam splitter 65. Then, they are made to enter the second pair of light receiving elements 68a, 68b.

As described above, the seventh embodiment of optical displacement measurement system 80 can eliminate the influence of the transmittivity, the reflectivity and the diffraction efficiency of the diffraction grating 11 from the detected interference signal. Additionally, the optical displacement measurement system 60 can determine the moving direction of the diffraction grating 11.

Figure 34:
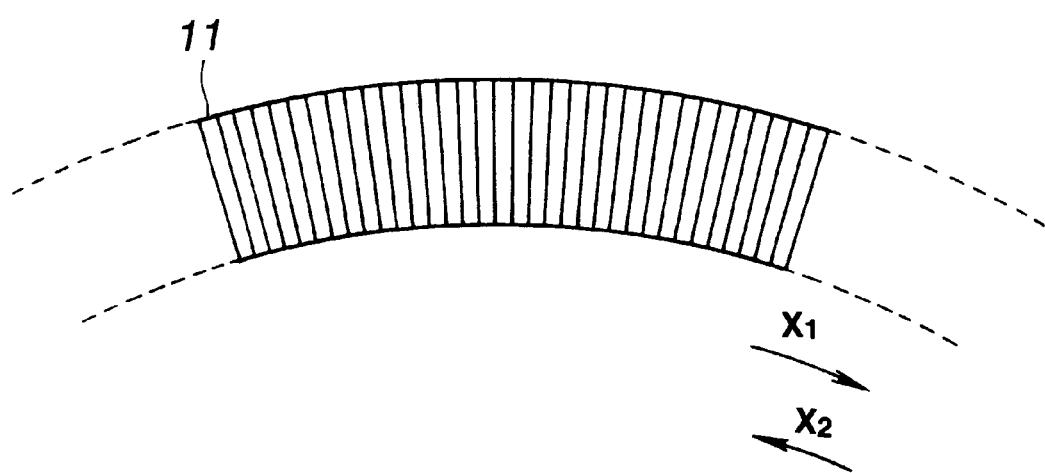
FIG. 34 is a schematic view of another diffraction grating that can be used for any of the first through seventh embodiment of optical displacement measurement system according to the present invention.

The first through seventh embodiments of optical displacement measurement system according to the invention are described above. While a diffraction grating 11 having grids arranged at regular intervals and in parallel with each other is used in each of the embodiments of optical displacement measurement system, a diffraction grating configured differently may alternatively be used. For example, a diffraction grating having radially arranged grids as shown in FIG. 34 may be used. The displaced position of a movable part of a machine tool can also be detected by using a diffraction grating having radially arranged grids. Still alternatively, an amplitude type diffraction grating with varying brightness, a phase type diffraction grating with a varying refractive index or a varying profile may be used for the purpose of the invention. In shorts, the type of diffraction grating is not limited for the purpose of the invention.

While the diffraction grating 11 is fitted to a movable part of a machine tool and moves with the movable part in each of the above described embodiments of optical displacement measurement system, it is sufficient for the purpose of the invention that the irradiation optical system and the interference optical system move relative to the diffraction grating 11. For example, it may be sufficient for the purpose of the present invention that the diffraction grating is stationary and the irradiation optical system and the if optical system move with the movable part of the machine tool.

The half mirrors, the beam splitters and the focussing elements used in any of the embodiments of optical displacement measurement system according to the invention are not limited to those made of thin film or a lens and they may alternatively be made of a diffraction optical element.

It is sufficient for the first focussing element of each of the above described embodiments of optical displacement measurement system to be arranged at a position where it can focus the coherent beam La on the lattice plane 11a of the diffraction grating 11 and therefore a plurality of such elements may be arranged at appropriate positions for the purpose of the invention. For example, the focussing element may be so arranged that it focusses the coherent beams La1, La2 produced by a half mirror (or polarized beam splitter) 22.

Additionally, it is sufficient that the second focussing element 28, the third focussing element 63, the fourth focussing element 83 and the fifth focussing element 84 are arranged so as to focus the diffracted beams Lb1, Lb2 on the light receiving plane of the light receiving element 13 or 67, 68 in each of the above described embodiment of optical displacement measurement system so that each of them may comprise a plurality of elements that may be arranged appropriately. For instance, a focussing element may be arranged to focus the diffracted beams Lb1, Lb2 before they are made to overlap with each other by the half mirror 27 or the beam splitter 61. Alternatively, a focussing element may be arranged to focus the diffracted beams Lb1, Lb2 after passing through the non-polarized beam splitter 64 for beam splitting.

What is claimed is:

1. An optical displacement measurement system comprising:
    a diffraction grating arranged for movement in directions parallel to a grating vector thereof;
    light emitting means for emitting a coherent beam of light;
    an irradiation optical system for dividing the coherent beam of light emitted from the light emitting means into two coherent beams of light for converting the two coherent beams of light into two converging beams of light, and for irradiating the two converging beams of light on the surface of the diffraction grating to form a first spot thereon;
    light receiving means;
    an interference optical system for causing the two diffracted beams of light obtained from the diffraction grating to interfere with each other forming two interfering diffracted beams of light, for converting the two interfering diffracted beams of light into two converging beams of light, and for irradiating the two converging beams of light on the light receiving means to form a second spot thereon; and
    position detecting means for determining a phase difference of the two diffracted beams of light from an interference signal produced by the light receiving means and detecting a relative position of the diffraction grating, wherein
    the diffraction grating is positioned substantially where the first beam spot has a minimum diameter and where an optical path difference between the beams of light forming the first beam spot has a minimum diameter, and
    the light receiving means is positioned substantially where the second beam spot has a minimum diameter and where an optical path difference between the beams of light forming the second beam spot has a minimum diameter.

2. The optical displacement measurement system according to claim 1, wherein said irradiation optical system is adapted to irradiate the two converging beams of light along a direction not perpendicular relative to the grating plane.

3. The optical displacement measurement system according to claim 1, wherein the irradiation optical system focusses the two converging beams of light on the diffraction grating at respective positions separated by a predetermined distance along a direction perpendicular relative to the grating vector.

4. The optical displacement measurement system according to claim 1, wherein the irradiation optical system focusses the two converging beams of light irradiating the diffraction grating at a same position on the grating plane of the diffraction grating.

5. The optical displacement measurement system according to claim 4, wherein the diffraction grating produces an angle of incidence for a converging beam and an angle of diffraction for a diffracted beam that are different.

6. The optical displacement measurement system according to claim 1, wherein the irradiation optical system has a polarized beam splitter for splitting the coherent beam emitted from the light emitting means into the two coherent beams of light with respective senses of polarization perpendicular to each other.

7. The optical displacement measurement system according to claim 6, wherein the interference optical system comprises:

a first polarized beam splitter for causing the two diffracted beams of light with respective senses of polarization perpendicular relative to each other to overlap;

a wave plate for circularly polarizing the two overlapping diffracted beams of light in opposite senses relative to each other;

a second polarized beam splitter for splitting each of the two circularly polarized diffracted beams of light into two interfering beams of light with respective senses of polarization perpendicular relative to each other; and a third polarized beam splitter for splitting each of the two circularly polarized diffracted beams of light into two interfering beams of light with respective senses of polarization perpendicular relative to each other, wherein the second and third polarized beam splitters are arranged to differentiate by 45 degrees the senses of polarization of the interfering beams of light being transmitted, and the position detecting means is adapted to determine a differential output of the two interfering beams of light with different senses of polarization produced by the second and third polarized beam splitters in order to detect the relative position of the diffraction grating.

8. The optical displacement measurement system according to claim 1, wherein the irradiation optical system comprises a non-polarized beam splitter for splitting the coherent beam of light emitted from the light emitting means into two coherent beams of light with a same sense of polarization.

9. The optical displacement measurement system according to claim 8, wherein the interference optical system comprises:

a first wave plate for transforming the two diffracted beams of light with a same sense of polarization into two diffracted beams of light with respective senses of polarization perpendicular relative to each other;

a first polarized beam splitter for causing the two diffracted beams of light to overlap with each other;

a second wave plate for circularly polarizing the two overlapping diffracted beams of light in opposite senses;

a second polarized beam splitter for splitting each of the circularly polarized diffracted beams of light into two interfering beams of light with senses of polarization perpendicular relative to each other; and a third beam splitter for splitting the two circularly polarized diffracted beams of light into two interfering beams of light with senses of polarization perpendicular relative to each other, wherein the second and third polarized beam splitters being are arranged to differentiate by 45 degrees the senses of polarization of the interfering beams of light being transmitted, and the position detecting means is adapted to determine the differential output of the two interfering beams of light with different senses of polarization produced by the second and third polarized beam splitters in order to detect the relative position of the diffraction grating.

10. The optical displacement measurement system according to claim 8, wherein the interference optical system comprises:

a wave plate for circularly polarizing the two diffracted beams of light with a same sense of polarization and causing the two diffracted beams of light to show opposite senses of polarization;

a second polarized beam splitter for splitting each of the circularly polarized diffracted beams of light into two interfering beams of light with senses of polarization perpendicular relative to each other;

a third beam splitter for splitting each of the two circularly polarized diffracted beams of light into two interfering beams of light with senses of polarization perpendicular relative to each other, wherein the second and third polarized beam splitters being arranged to differentiate by 45 degrees the senses of polarization of the interfering beams of light being transmitted, and the position detecting means is adapted to determine a differential output of the two interfering beams of light with different senses of polarization produced by the second and third polarized beam splitters in order to detect the relative position of the diffraction grating.

11. The optical displacement measurement system according to claim 1, wherein the diffraction grating is of a reflection type.

12. The optical displacement system according to claim 1, wherein the diffraction grating has radially arranged grids.

13. The optical displacement measurement system according to claim 1, wherein the light emitting means is a multimode semiconductor laser that emits a coherent beam of light with a coherent length of about several hundreth micrometers for detecting a difference in the length of an optical path as a modulation factor.

* * * * *